US008219385B2

(12) United States Patent
Sprecher et al.

(10) Patent No.: US 8,219,385 B2
(45) Date of Patent: Jul. 10, 2012

(54) COMPUTER-IMPLEMENTED METHOD AND SYSTEM FOR CONDUCTING A SEARCH OF ELECTRONICALLY STORED INFORMATION

(75) Inventors: Benjamin Sprecher, Providence, RI (US); Joshua Herzig-Marx, Newton, MA (US); Kristian Cibulskis, Somerville, MA (US); Tim J. Fennell, Cambridge, MA (US)

(73) Assignee: Incentive Targeting, Inc., Cambridge, MA (US)

( * ) Notice: Subject to any disclaimer, the term of this patent is extended or adjusted under 35 U.S.C. 154(b) by 1041 days.

(21) Appl. No.: 12/099,210

(22) Filed: Apr. 8, 2008

(65) Prior Publication Data

US 2009/0254337 A1 Oct. 8, 2009

(51) Int. Cl.
*G06F 17/28* (2006.01)
*G06F 17/27* (2006.01)
*G06F 17/21* (2006.01)
*G10L 17/00* (2006.01)
*G10L 15/26* (2006.01)
*G10L 15/04* (2006.01)
*G10L 15/00* (2006.01)
*G10L 21/00* (2006.01)

(52) U.S. Cl. ....... 704/9; 704/4; 704/5; 704/10; 704/246; 704/235; 704/251; 704/254; 704/257; 704/270; 704/270.1; 704/275

(58) Field of Classification Search ............... 704/9, 10, 704/4, 5, 235, 246, 251, 254, 257, 270, 270.1, 704/275; 707/736, 757
See application file for complete search history.

(56) References Cited

U.S. PATENT DOCUMENTS

| 4,688,195 | A | 8/1987 | Thompson et al. | |
|---|---|---|---|---|
| 5,812,840 | A | 9/1998 | Shwartz | |
| 6,173,261 | B1 * | 1/2001 | Arai et al. | 704/257 |
| 6,173,266 | B1 * | 1/2001 | Marx et al. | 704/270 |
| 6,279,017 | B1 * | 8/2001 | Walker | 715/201 |
| 6,279,018 | B1 * | 8/2001 | Kudrolli et al. | 715/234 |
| 6,336,214 | B1 * | 1/2002 | Sundaresan | 717/143 |
| 6,434,523 | B1 * | 8/2002 | Monaco | 704/257 |

(Continued)

OTHER PUBLICATIONS

Krzysztof Hauke, et al. "Building Data Mining Models in the Oracle 9i Environment", Informing Science Jun. 2003.*

(Continued)

*Primary Examiner* — Douglas Godbold
*Assistant Examiner* — Edgar Guerra-Erazo
(74) *Attorney, Agent, or Firm* — Rajesh Vallabh; Foley Hoag LLP

(57) ABSTRACT

A computer-implemented method, system, and computer program product are provided for conducting a search of electronically stored information. The method includes: (a) providing a user with an interactive targeting rule editor to enable the user to formulate a targeting rule to identify desired search results, the targeting rule comprising a natural language text string, the interactive targeting rule editor allowing the user to change one or more designated editable portions of the natural language text string to one of a set of specified alternate portions, delete one or more designated removable portions of the natural language text string, or add one or more of a set of specified insertable portions to form a syntactically valid targeting rule in accordance with a targeting rule grammar; (b) receiving the text string or a representation thereof from the user; (c) translating the text string or a representation thereof into an executable query; and (d) executing the executable query against the electronically stored information to generate search results.

37 Claims, 23 Drawing Sheets

U.S. PATENT DOCUMENTS

| | | | |
|---|---|---|---|
| 6,523,172 B1* | 2/2003 | Martinez-Guerra et al. | 717/143 |
| 6,611,802 B2* | 8/2003 | Lewis et al. | 704/235 |
| 6,760,700 B2* | 7/2004 | Lewis et al. | 704/235 |
| 6,801,897 B2* | 10/2004 | Kist et al. | 704/275 |
| 6,970,882 B2* | 11/2005 | Yao et al. | 1/1 |
| 7,099,809 B2* | 8/2006 | Dori | 703/6 |
| 7,392,162 B1* | 6/2008 | Srinivasan et al. | 703/2 |
| 7,653,545 B1* | 1/2010 | Starkie | 704/275 |
| 2002/0138248 A1* | 9/2002 | Corston-Oliver et al. | 704/1 |
| 2002/0156616 A1* | 10/2002 | Russell | 704/4 |
| 2002/0165883 A1* | 11/2002 | Sans et al. | 707/530 |
| 2002/0169595 A1* | 11/2002 | Agichtein et al. | 704/9 |
| 2003/0050772 A1* | 3/2003 | Bennett | 704/9 |
| 2005/0021533 A1* | 1/2005 | Ayachitula et al. | 707/100 |
| 2006/0018551 A1* | 1/2006 | Patterson | 382/229 |
| 2006/0020607 A1* | 1/2006 | Patterson | 707/100 |
| 2006/0025091 A1* | 2/2006 | Buford | 455/154.2 |
| 2006/0031195 A1* | 2/2006 | Patterson | 707/3 |
| 2006/0100854 A1* | 5/2006 | Ance et al. | 704/9 |
| 2006/0241946 A1* | 10/2006 | Oerder | 704/270.1 |
| 2006/0294155 A1* | 12/2006 | Patterson | 707/200 |
| 2007/0094306 A1* | 4/2007 | Kyriazakos | 707/104.1 |

OTHER PUBLICATIONS

Matthew Boyle, Kroger's Secret Weapon, CNNMoney.com, Nov. 27, 2007.

Bret Victor, Magic Ink Information Software and the Graphical Interface, Mar. 15, 2006.

\* cited by examiner

If you want to add conditions to your sentence, click on the (+) symbol on the left.

(+) This offer should be available to all shoppers who were in the top 10% of shoppers by total spend during the last quarter

— 418

*Click the highlighted area to choose between*

- everyone
- all shoppers who have purchased at least 3 item(s)...
- all shoppers who are in the ALL SHOPPERS group
- all shoppers who were in the top 10% of shoppers by...

This offer should be available to all shoppers who were in the top 2.5% of shoppers by total spend during the last year and who have purchased at least 2 item(s) from the category[x], on average, per week in the last year^

| pot |
|---|
| POT PIES FROZ |
| POTATO CHIPS |
| POTATOES POLY BAGS |
| POTATOES, MISC |
| POTPOURRI & INCENSE |
| POTS & PANS |
| SPECIALTY POTATO FRZ | atching Shoppers

FIGURE 4P

Who do you want to target?

To change part of the sentence, just click on the bold or underlined words.

If you want to add conditions to your sentence, click on the (+) symbol on the left.

(+)    This offer should be available to all shoppers who were in the top 25% of shoppers by total spend during the last year (+) (−)   and who have purchased at least 2 item(s) from the POT PIES FROZ category[x] in total in the last year

460

[Find Matching Shoppers]

Results
Found 74 targeted shoppers!

Retailer    Loyalty Id

FIGURE 4T

COMPUTER-IMPLEMENTED METHOD AND SYSTEM FOR CONDUCTING A SEARCH OF ELECTRONICALLY STORED INFORMATION

BACKGROUND

The present invention relates generally to a computer-implemented method and system for conducting a search of electronically stored information and, more particularly, to conducting such searches using an interactive targeting rule editor to formulate a targeting rule comprising a natural language text string, translating the text string or a representation thereof into an executable query, and executing the query against the electronically stored information.

BRIEF SUMMARY OF EMBODIMENTS OF THE INVENTION

In accordance with one or more embodiments of the invention a computer-implemented method is provided for conducting a search of electronically stored information. The method includes (a) providing a user with an interactive targeting rule editor to enable the user to formulate a targeting rule to identify desired search results, the targeting rule comprising a natural language text string, the interactive targeting rule editor allowing the user to change one or more designated editable portions of the natural language text string to one of a set of specified alternate portions, delete one or more designated removable portions of the natural language text string, or add one or more of a set of specified insertable portions to form a syntactically valid targeting rule in accordance with a targeting rule grammar; (b) receiving the text string or a representation thereof from the user; (c) translating the text string or a representation thereof into an executable query; and (d) executing the executable query against the electronically stored information to generate search results.

In accordance with one or more additional embodiments of the invention, a computer-implemented system is provided for conducting a search of electronically stored information, comprising: a data storage system containing the electronically stored information; and a server receiving a natural language text string or a representation thereof from a user, the natural language text string or representation thereof comprising a targeting rule directed at identifying desired search results from the electronically stored information, the server translating the natural language text string or representation thereof into an executable query, and executing the executable query against the electronically stored information to generate the desired search results; wherein the user generates the natural language text string using an interactive targeting rule editor to enable the user to formulate the natural language text string, the interactive targeting rule editor allowing the user to change one or more designated editable portions of the natural language text string to one of a set of specified alternate portions, delete one or more designated removable portions of the natural language text string, or add one or more of a set of specified insertable portions to form a syntactically valid targeting rule in accordance with a targeting rule grammar.

In accordance with one or more further embodiments of the invention, a computer program product is provided for conducting a search of electronically stored information, the computer program product residing on a computer readable medium having a plurality of instructions stored thereon which, when executed by the processor, cause that processor to: (a) provide a user with an interactive targeting rule editor to enable the user to formulate a targeting rule to identify desired search results, the targeting rule comprising a natural language text string, the interactive targeting rule editor allowing the user to change one or more designated editable portions of the natural language text string to one of a set of specified alternate portions, delete one or more designated removable portions of the natural language text string, or add one or more of a set of specified insertable portions to form a syntactically valid targeting rule in accordance with a targeting rule grammar; (b) translate a natural language text string generated by the user or a representation of the natural language text string into an executable query; and (c) execute the executable query against the electronically stored information to generate search results.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

DETAILED DESCRIPTION

Figure 1:
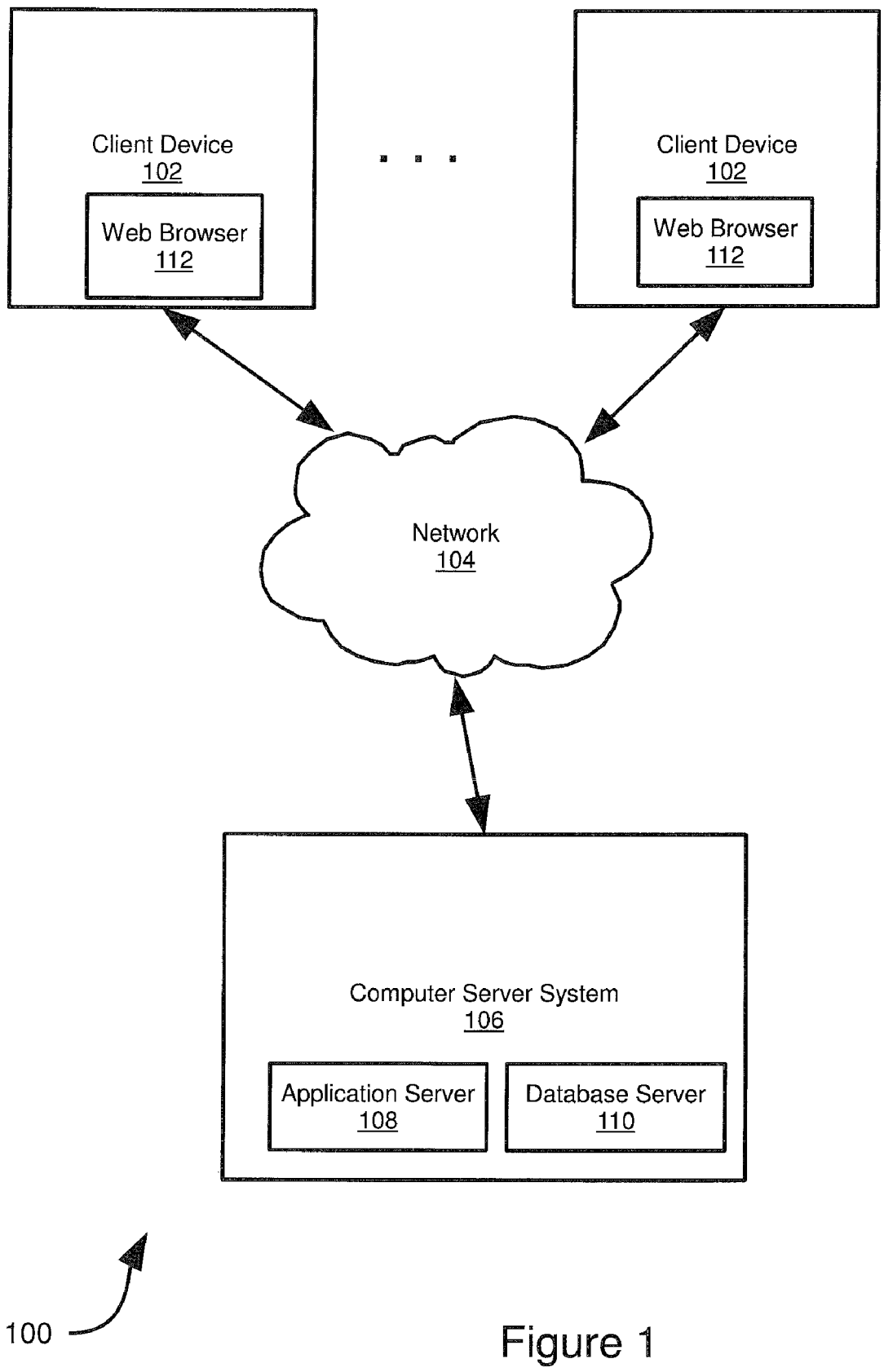
FIG. 1 is a simplified block diagram illustrating an exemplary system for conducting a search of electronically stored information in accordance with one or more embodiments of the invention.

Briefly, and as will be described in further detail below, various embodiments of the present invention are directed to computer-implemented techniques for conducting searches of electronically stored information. As used herein, the term "electronically stored information" means information that is stored in an electronically-accessible medium (which can include, but is not limited to, electrical, digital, magnetic, optical, and electromagnetic media). A user can use an interactive targeting rule editor to formulate a targeting rule comprising a natural language text string to identify desired search results. As used herein, the term "targeting rule" refers to any rule directed to identify, select, search for, retrieve, or filter information. The interactive targeting rule editor allows the user to select and change one or more designated editable portions of a default text string to one of a set of specified alternate portions and to add/delete words or phrases to form a syntactically-valid targeting rule in accordance with a targeting rule grammar. The targeting rule grammar is a domain-specific language designed to allow users to express the precise criteria by which they wish to identify search results. The text string is received from the user and translated into an executable query. The executable query is then executed against the electronically stored information to generate search results, which can be returned to the user, stored, processed, or used for some other purpose.

The interactive targeting rule editor in accordance with various embodiments provides an interactive user interface that allows users, particularly non-technical business users, to quickly, easily, and intuitively build and execute complex queries against electronically stored data. The targeting rule editor allows users to generate targeting rules in a readable and readily understandable natural language text string. (As used herein, the term "natural language" refers to a spoken or written language that is easily understandable by a native speaker of the language, and which adheres to a formal grammatical structure.) Users can point, click, and interact with the text of the targeting rule. Because the text is designed for readability, untrained users can quickly recognize the intent of a rule and modify it as required to meet their needs. Users with limited computer skills can thereby create arbitrarily complex and nuanced targeting rules with little or no training. The targeting rule editor can allow users to alter the rule text in only syntactically valid ways. The targeting rule editor can also provide context-sensitive hints and examples, which allow users to quickly learn the language and access the functionality of the language without having to memorize particular vocabulary and syntax.

The techniques described herein utilizing an interactive targeting rule editor, executable query translator, and targeting engine to conduct a search of electronically stored information can have numerous applications. For example, the electronically stored information might contain data on a plurality of members of a group and characteristics of the members, and the interactive targeting rule editor can be used to formulate search queries to identify a particular subset of members of the group. (As used herein, the term "members" can include either people or things.) In one particular application, the search techniques can be used in a targeted marketing service to identify particular groups of shoppers to whom a marketing campaign can be targeted. For example, manufacturers, retailers, and brokers of grocery and consumer goods can use the search techniques described herein to create and deliver highly targeted promotions and marketing messages to subsets of shoppers based on each shopper's detailed shopping history.

The search techniques described herein in accordance with various embodiments of the invention can also have numerous other applications. The technology can generally allow a user to describe a set of behaviors that can be identified from any information storage system such as a database or log of events. In the case of the targeted marketing service described above, those activities can be, e.g., transaction line items representing purchases of products at a retailer. However, various other activities can also be searched by making appropriate changes to the targeting rule grammar. Some other exemplary applications of the techniques described herein can include, identifying website/e-commerce users by their behavior, identifying possible criminals or terrorists based on specific behaviors from a database of activities, identifying students who need additional assistance/instruction, identifying top-performing sales people, identifying outliers in drug or therapy trials, detecting suspected fraud, waste, or abuse from records of financial transactions (such as a credit card or bank account transaction log), medical records, insurance claims, etc., and finding computational or communication bottlenecks from collected usage data, log files, network diagnostics, and/or benchmarking results.

In addition, without the targeting engine, the interactive editor interface of the targeting rule editor can be used for writing out any constrained grammar including, e.g., a SQL editor, a spreadsheet formula editor, an editor for legal documents, wills, contracts, etc., an editor for writing out configuration rules for computer/IT management, or a tool for writing out user policies.

The techniques described herein are also generally applicable in situations where users, particularly non-technical business users, are configuring settings or parameters for constrained problem spaces. These can include domain-specific search applications such as, e.g., document archive searching; file searching on a computer or network; company or individual searching; real estate searching; price comparison searching; reference, book, and article searching; travel searching (e.g., flights, hotels, cars, vacation packages, rental properties, cruises, etc.); and product feature searching (such as for a store or website selling products with many attributes such as, e.g., computer parts or automotive parts).

Other possible applications can include configuration of complex filtering or auditing applications such as, e.g., e-mail filter rules, security screens and filters for electronic communications; auditing rules for identifying fraudulent or unusually expensive insurance claims; rules for flagging suspicious financial transactions; network or firewall log filtering rules for identifying intrusion attempts, denial of service attacks, or performance bottlenecks; and rules about syndicated advertising (such as Google's AdSense or DoubleClick's banner ads). For example, if a user needs to set up complex rules to govern the context in which their ad should be shown across one or more websites, the techniques described herein provide a user-friendly method to do so. In addition, if a website owner wishes to control the specific types of ads that will be shown on their site, the user interface can make that process simple and understandable.

FIG. 1 illustrates an exemplary system 100 for conducting a search of electronically stored information in accordance with one or more embodiments of the invention. The system 100 includes a plurality of client devices 102 used by users to formulate targeting rules to identify desired search results. Each of the client devices 102 is connected via a network 104 to a computer server system 106. The computer server system 106 includes an application server 108 and a database server (or any type of information storage and retrieval system) 110. The application server 108 provides an interactive targeting rule editor to the users, translates targeting rules received from the users into executable queries and executes the queries against information stored by the database server 110 to generate search results, which are returned to the users over the network 104, or which may be stored, processed, or used for some other purpose.

In the FIG. 1 embodiment, the targeting rule editor is provided to the user by a web server over the network 104. In other embodiments, the targeting rule editor can be installed to reside on the user device, e.g., by being downloaded over the Internet or other computer network, or from a CD-ROM or other removable memory.

The computer server system 106 may comprise one or more physical machines, or virtual machines running on one or more physical machines. In addition, the computer server system 106 may comprise a cluster of computers or numerous distributed computers that are connected by a network or the internet.

The client devices 102 may, e.g., be personal computers such as a Pentium®-based desktop or notebook computer running a Windows® operating system. Alternatively, the client devices 102 can be, e.g., portable communication devices such as a personal digital assistant (PDA) or a cellular telephone. The client devices 102 include a display interface (a graphical user interface) and associated input devices (e.g., a keyboard, mouse, touch-sensitive screen (or other pointing device)). The client devices 102 can include a browser 112, which may, e.g., be any of a variety of Web browsers such as the Microsoft Internet Explorer® or Mozilla Firefox® Web browsers.

The network 104 may, e.g., be the Internet, an intranet, or other network connection. In the case of the Internet, the computer server system 106 can be one of a plurality of Web servers that are accessible by clients such as the client devices 102.

In the system 100 described above, users operating client devices 102 can remotely access the application server 108 over the network 104. In accordance with one or more alternate embodiments, the system for conducting a search of electronically stored information is implemented in a stand-alone (i.e., non-network based) computer system. For example, the functions of the interactive targeting rule editor to formulate targeting rules and the application server to translate the targeting rules into executable queries are implemented in the same physical or virtual computer system.

In accordance with one or more embodiments of the invention, the functions of the various components of the search system (e.g., the interactive targeting rule editor and the application server) can be distributed across one or more virtual or physical computer systems, or could be run in a cluster to distribute the workload among multiple computers. More than one computer or virtual machine or cluster may provide a service that is delivered to the user. Similarly, a single computer or virtual machine may provide more than one service.

Figure 2:
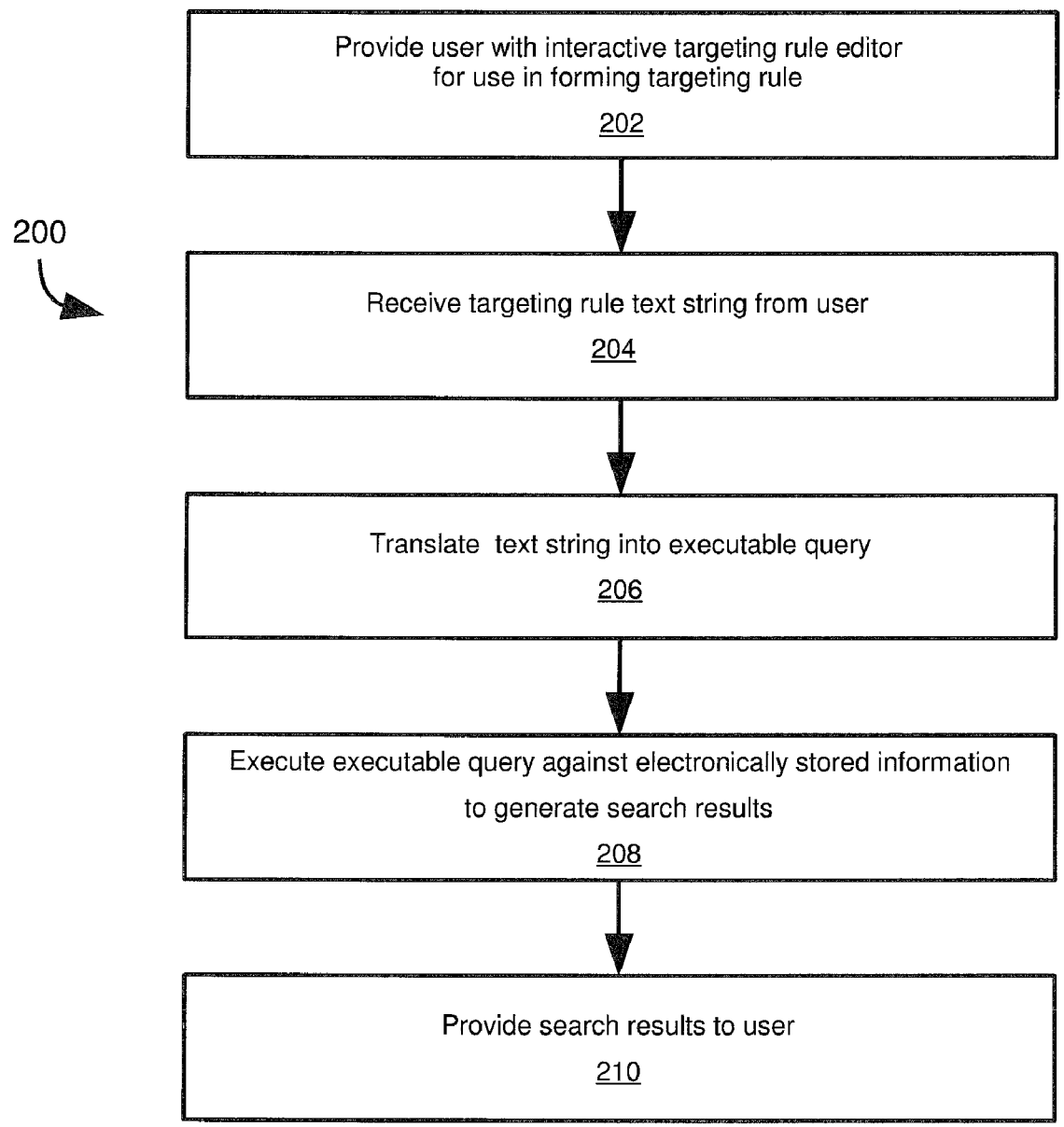
FIG. 2 is a simplified flowchart illustrating an exemplary method for conducting a search of electronically stored information in accordance with one or more embodiments of the invention.
Figure 3:
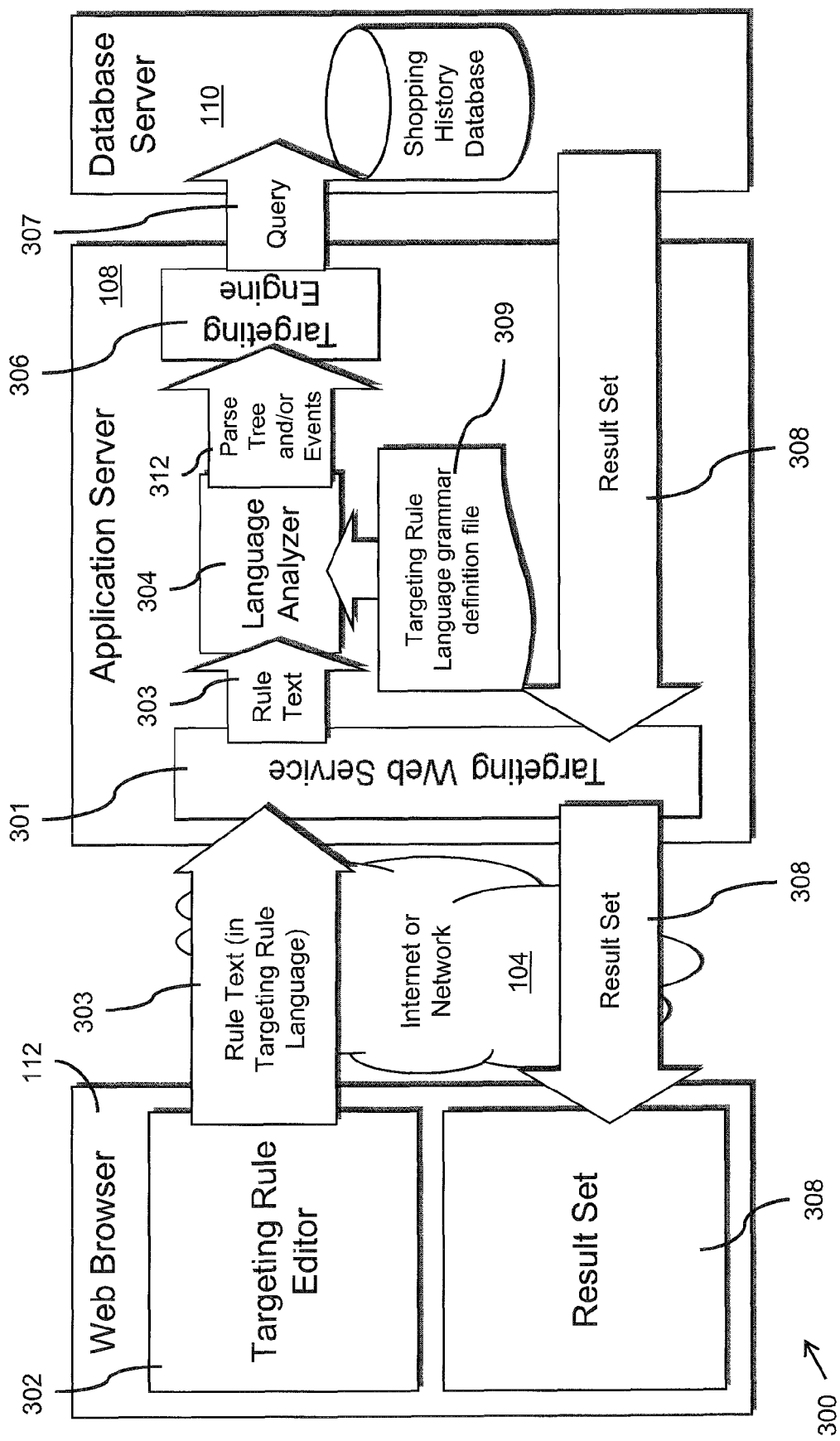
FIG. 3 is a simplified block diagram illustrating processing of search queries in accordance with one or more embodiments of the invention.

FIG. 2 is a flowchart generally illustrating a method of conducting a search of electronically stored information in accordance with one or more embodiments of the invention. FIG. 3 is a simplified block diagram illustrating a targeting rule interface and processing architecture 300 in accordance with one or more embodiments of the invention.

At step 202 of the FIG. 2 flowchart, a user of the system is provided with an interactive targeting rule editor for use in forming targeting rules to identify desired search results. As shown in FIG. 3, the targeting rule editor 302 can be provided to the user by the application server 108 and executed in the web browser 112 of a client device 102 operated by the user. In certain alternate embodiments, the targeting rule editor 302 is provided to the user by a different web server, i.e., a server that does not process the text string generated by the user. In certain other embodiments, the targeting rule editor 302 is provided to the user to be locally installed on the user device.

At step 204, the application server 108 of the computer server system 106 receives the targeting rule text string 303 from the client device 102 operated by the user over the network 104.

At step 206, the application server 108 translates the text string 303 received from the user into an executable query 307. In accordance with one or more embodiments of the invention, as shown in FIG. 3, the application server 108 includes a language analyzer 304 and a targeting engine 306, which together translate the text string 303 into an executable query 307. The language analyzer 304 processes the text string received from the user and converts it into a data structure representing the grammatical structure and content of the text according to a grammar definition file 309 of the targeting rule grammar. The language analyzer 304 comprises a parser for identifying the grammatical structure and content of the text, optionally preceded by a lexical analysis step and optionally followed by a semantic analysis step. The targeting engine 306 is a program that constructs an executable query string from the output of the language analyzer 304.

At step 208, the application server 108 executes the executable query against the information stored electronically by the database server 110 to generate the search results 308.

At step 210, the search results are provided to the user. In the FIG. 3 embodiment, the results are transmitted to the user over the network 104. Alternately, the results can be stored, processed, or used for some other purpose.

The targeting rule editor 302 allows a user to construct a targeting rule comprising a natural language text string 303, which is a simple string of characters (such as, e.g., ASCII and UTF-8) that forms a grammatically correct targeting rule according to the specifications set forth in the targeting rule grammar definition file 309. Because the targeting rule must be processed programmatically, it should not contain any mistakes, misspellings or inconsistencies with respect to the formal grammar definition, and the interactive targeting rule editor 302 is accordingly configured to generate syntactically valid targeting rules. The text string 303 formulated by the user may optionally be transformed into some representation of the natural language text string (e.g., as serialized JavaScript objects) prior to being transmitted to the Targeting Web Service 301.

The targeting rule text string 303 is fed into the language analyzer 304 for lexical and syntactic analysis using the formal targeting rule grammar definition file 309. (It should be understood that the targeting rule text string fed to the language analyzer 304 may be optionally transformed by the Targeting Web Service 301 into some representation of the targeting rule text string.) The language analyzer 304 triggers events to inform the targeting engine 306 about the specifics of the targeting rule as it is parsed. The events are processed in the targeting engine 306 to track the state of the targeting rule. Once all events have been processed, the targeting engine 306 constructs an equivalent executable query string 307.

The parser in the language analyzer 304 can be a general-purpose parser using a formal grammar definition file 309 designed particularly for the targeting rules generated by the targeting rule editor 302. There are many widely-used parsers that can be used for this purpose including, e.g., YACC, ANTLR, Bison, and JavaCC. If the language analyzer 304 includes a distinct lexical analysis step, this step can be performed by purpose-built software or by a general-purpose lexer including, e.g., lex, Flex, or JLex.

The language analyzer 304 processes input text string 303 received from the user and converts it into a data structure representing the grammatical structure and content of the text according to a particular grammar. In accordance with one or more embodiments of the invention, the language analyzer 304 includes three primary steps. First, in the optional lexical analysis step, the lexer identifies tokens from a sequence of input characters. (A token is the smallest unit with meaning in a language, such as a word, a number, a punctuation mark, or a space.) Next, in a syntactic analysis step, these tokens are processed by the parser to build a data structure known as a parse tree. During the syntactic analysis step, some parsers can trigger events when specific grammatical constructs are encountered. During syntactic analysis, a determination is made as to whether the ordered list of tokens from lexical analysis forms a grammatically correct string in the language defined by the grammar. The language analyzer also optionally performs a semantic analysis of the input text string received from the user to ensure correctness of the input. For example, the semantic analysis step may help identify dates which are syntactically valid but are not correct, such as Jun. 31 or Feb. 29, 2007.

In order to know what rules to use for performing the lexical and syntactic analysis, the parser utilizes the grammar definition file 309. The precise notational conventions used in the grammar definition file can vary from parser to parser, but in general, the file describes the particular keywords, punctuation, order, and hierarchical structure of the language. In some cases, the notation used is a variation on Backus-Naur Form (BNF), a standard convention used for writing grammar definitions. The file can also contain annotations indicating particular events for the parser to trigger when it encounters certain grammatical constructs or values in the text being parsed.

A grammar includes a "hierarchy." As a simple example, in the English language, a sentence can be composed of a subject followed by a predicate. The subject can be composed of a pronoun, and the predicate can be composed of a verb followed by a direct object. The direct object, in turn, can be composed of a preposition and a noun. An example of such a sentence is "I yelled at Bob." In this sentence, "I" is a pronoun, which is the subject of the sentence. "At" is a preposition, "Bob" is a proper noun (which is a type of noun), and together they form the direct object of the sentence. "Yelled" is a verb, which along with the direct object forms the predicate of the sentence. A subject and a predicate together form a sentence, so "I yelled at Bob" is a valid sentence according to the English grammar. By contrast, "I at yelled Bob" is not a grammatically correct English sentence because it does not conform to the rules of the English grammar.

Lexical and syntactic analysis is commonly taught in the context of sentence diagramming. The identification of words, numbers, spaces, and punctuation is lexical analysis. The identification of parts of speech and the underlining and diagramming of the structure of the sentence is syntactic analysis.

The following is an example provided to illustrate a simple parser for mathematical statements. To illustrate the fundamentals of a parser, consider the exemplary "language" of simple mathematical expressions made up of an integer followed by a mathematical operator followed by another integer. In this language, the expressions "12+5" and "30/15" are both meaningful and grammatically correct, while "12+/*5" and "+34" (and "I yelled at Bob") are not. A very simple grammar definition for this language (written in BNF) could be written as follows:

following hierarchy shown with one input character per column on the bottom and the different levels of the grammatical hierarchy building from bottom to top.

| | Representation of a Parse Tree for the string "12+2<EOF>" | | | |
|---|---|---|---|---|
| Top Level | | <expression> | | |
| 2nd Level | <integer> | <operator> | <integer> | <EOF> |
| Bottom Level | <digit> <digit> | <operator> | <digit> | <EOF> |
| Input Characters | "1" "2" | "+" | "2" | "<EOF>" |

In accordance with one or more embodiments, once a rule has been created using the interactive targeting rule editor and has been parsed against the targeting rule language grammar definition into a parse tree, the parse tree is converted into an executable database query. To perform this conversion, a targeting engine 306 is provided that is specific to the targeting rule grammar and to the database structure. The targeting engine 306 reads through the parse tree that the parser generates and converts it into the equivalent SQL query according to the interpretations specified as part of the targeting rule language grammar definition. Since the range of possible targeting rules is dictated by the targeting rule language grammar, and the database table names, column names, and relationships are determined by the specific structure of the database, the targeting engine implementation is dependent on the particular design of the grammar and the database. The implementation should preferably allow all possible targeting rules to be interpreted by the targeting engine into rational queries for the database.

Together with the language analyzer 304, the targeting engine 306 translates between the targeting rules received from the user and the machine-executable query. In accordance with various embodiments, the burden of synchronizing database or targeting rule language grammar changes lies within the targeting engine and is generally hidden from the end user. This allows the data model to be modified and improved as needed without imposing a re-training burden on existing users.

In accordance with one or more alternate embodiments, the targeting engine 306 keeps track of the query it needs to build using an object to represent the query. As the targeting rule written in the targeting rule language is parsed, the language analyzer 304 triggers an event to inform the targeting engine 306 whenever it encounters important language structures and values. The targeting engine 306 listens for these events,

| Definition | Explanation |
|---|---|
| <expression> ::= <integer> <operator> <integer> <EOF> | An expression consists of an integer, followed by an operator, followed by another integer, followed by an End-Of-File marker. |
| <integer> ::= <digit> ( <digit> )* | An integer consists of a digit, followed by zero or more additional digits |
| <digit> ::= "0" | "1" | "2" | "3" | "4" | "5" | "6" | "7" | "8" | "9" | A digit consists of either the string "0" or the string"1" or the string "2", etc. |
| <operator> ::= "+" | "−" | "*" | "/" | An operator consists of either the string "+" or the string "−" or the string "*" or the string "/" |

Consider a parser running against a file that contained the following character string: "12+2<EOF>". To illustrate the data structure that the parser would construct, consider the and every time such an event occurs, it updates the state of the query object to reflect the specifics of the targeting rule. Once the targeting rule has been completely parsed, and the targeting engine 306 has finished all updates to the query state, the targeting engine 306 processes the query object and translates it into an executable query.

The following example illustrates the operation of a targeting engine for a simplified grammar and data structure. As previously discussed, one exemplary application of the techniques described herein is for use in identifying subsets of individual shoppers from a larger group of shoppers based on the shoppers' shopping behavior. As a very simple example, consider a shopper targeting rule with the following grammar:

| Definition | Explanation |
| --- | --- |
| <targeting_rule> ::= "This offer should be available to" ( <all_shoppers> \| <shoppers_since_date> ) <EOF> | A targeting rule comprised of the keywords "This offer should be available to", followed by either an all_shoppers or a shoppers_since_date, followed by an End-Of-File marker. |
| <all_shoppers> ::= "all shoppers" | An all_shoppers is comprised of the keywords "all shoppers" |
| <shoppers_since_date> ::= "any shopper who purchased after the date" <date> | A shoppers_since_date is comprised of the keywords "any shopper who purchased after the date", followed by a date |
| <date> ::= <digit><digit><digit><digit> "-" <digit><digit> "-" <digit><digit> | A date consists of 4 consecutive digits, followed by the string "-", followed by 2 consecutive digits, followed by the string "-", followed by 2 consecutive digits (e.g. 2007-12-25). |
| <digit> ::= "0" \| "1" \| "2" \| "3" \| "4" \| "5" \| "6" \| "7" \| "8" \| "9" | A digit consists of either the string "0" or the string"1" or the string "2", etc. |

In this example, the shopper history data is stored in a simple relational database that can be queried using Structured Query Language (SQL), and there is a single table called "purchases" that contains a column for the customer ID (called "customer_id") and a column for the date of the shopper's most recent purchase (called "purchased_on").

Also, in this example, the parser is configured to send an event to the targeting engine whenever it encounters an all_shoppers or a shoppers_since_date. When notifying the targeting engine about a shoppers_since_date, it also passes along the associated date value.

The targeting engine for this vastly simplified grammar and data model can be programmed as follows:

1. If the parser triggers an event indicating an all_shoppers was found during parsing, then:
   a. Set the query object's allShoppers flag to the value TRUE.
   b. Skip to step 3.
2. If the parser triggers an event indicating a shoppers_since_date was found during parsing, then:
   a. Set the query object's allShoppers flag to the value FALSE.
   b. Set the query object's sinceDate field to the date value included in the event.
3. If the query object's allShoppers flag has a value of TRUE, then
   a. Output the text "SELECT DISTINCT(customer_id) FROM purchases" and skip to step 5.
4. If the query object's allShoppers flag has a value of FALSE, then
   a. Output the text "SELECT DISTINCT(customer_id) FROM purchases WHERE purchased_on>"
   b. Output the text for the date value in the query object's sinceDate field, surrounded by quote chacters.
5. Close the output stream and stop processing.

This exemplary targeting engine is written with an understanding of the targeting grammar, the intent of the different levels in the targeting grammar, the particular schema being used to store the data, and the syntax of the query language (in this case, SQL) used to query the data base.

Because the targeting rule language grammar is designed to be easily readable and understandable to a non-technical English (or other language) speaker, the parse tree for a typical targeting rule in targeting rule language is typically quite complex and needs a significant translation into the executable query. For performance reasons as well as for maintenance reasons, it is generally impractical to make the database structure conform one-to-one with the structure of the grammar for the targeting rule language. Therefore, the mapping and translation logic within the targeting engine can be quite complex.

The output of the targeting engine 306 is an executable query that can be used to retrieve the set of appropriate search results. In some embodiments, the query is written in SQL. However, the particular form of the executable query is determined by the requirements of the data store being used to hold the data being searched. For many relational database systems, SQL is the language in which executable queries are written. However, other methods of storing data use different query systems such as, e.g., Hibernate Query Language (HQL), Object Query Language, Enterprise Java Bean Query Language, Amazon SimpleDB Query expressions, ODBC, JDBC, XML:DB API, etc. A single canonical, internal representation of the query can be maintained as an intermediate step to facilitate the use of multiple query systems, or for performance or other purposes. If such an internal representation is used, then that internal representation is translated into the desired query language. Since the targeting engine 306 must output a grammatically correct query in the particular language being used, the implementation of the query generation step of the targeting engine 306 is dependent on the choice of technology for the data store.

Whatever technology is used to store and query the electronically stored information, the next step in the targeting process is to execute the query that was produced by the targeting engine 306 and to receive a set of search results that match the targeting rule as a response from the data storage system.

If the system is used for a shopper targeting application, depending on the particular schema and technology used, the result set may contain identifiers for each matching shopper or it may contain some or all of the data records for those matching shoppers. With slight modifications, the queries can be executed to return a count of the number of matching shoppers rather than the list of matching shoppers, which can help avoid situations where large numbers of matching shoppers slow down the system. In some alternate embodiments, the result set is cached (rather than returned interactively to the user) to accelerate future queries or to be used for other purposes.

Figure 4A:
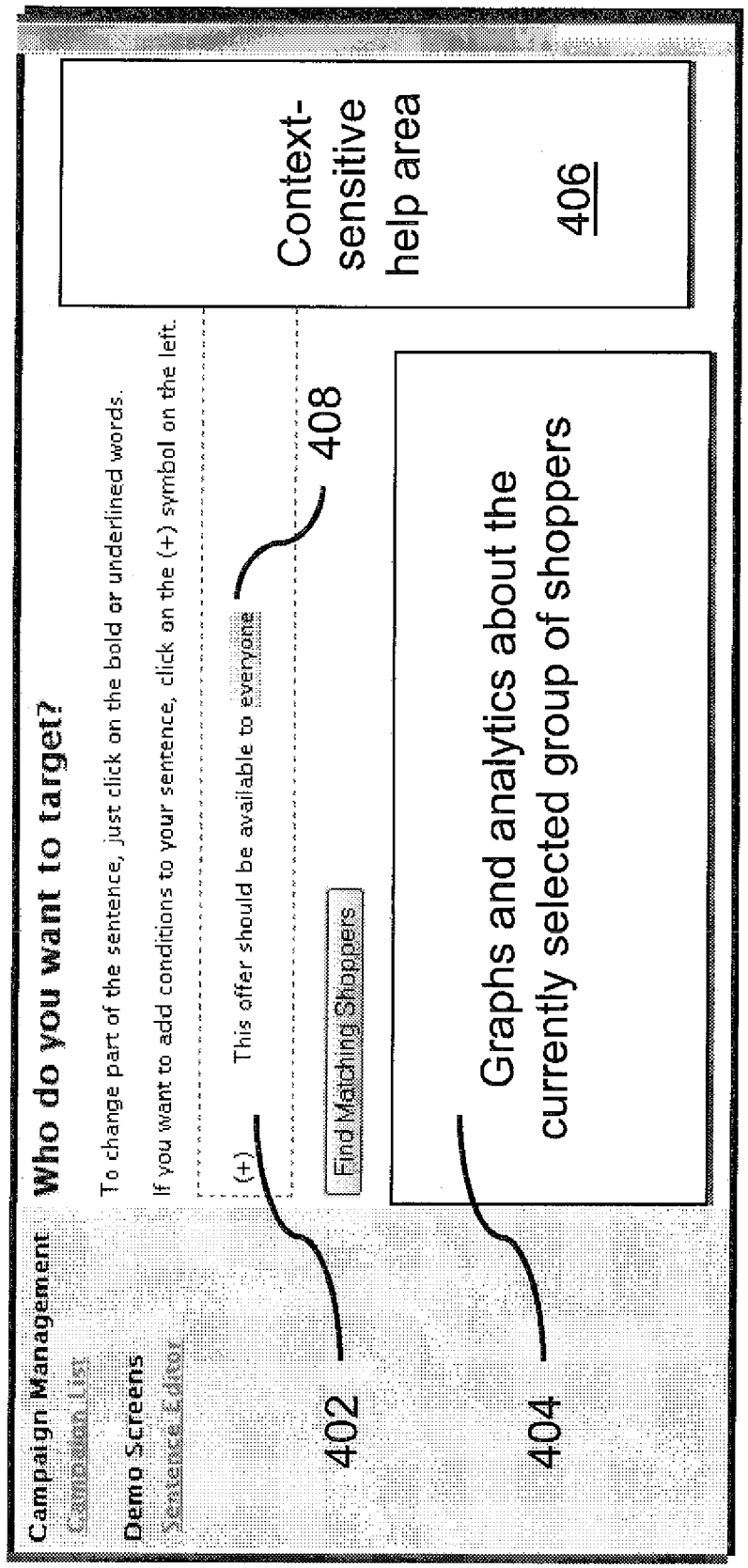
FIGS. 4A-4T are screenshots illustrating use of an exemplary interactive targeting rule editor to formulate targeting rules in accordance with one or more embodiments of the invention.

FIGS. 4A-4T are exemplary screenshots illustrating use of the targeting rule editor by a user to formulate an exemplary targeting rule to identify a subset of shoppers from a larger group of shoppers based on a shopper's shopping behavior.

FIG. 4A illustrates an initial view presented to the user. The interface includes an initial generic default targeting rule 402, which can be edited by the user using the interactive targeting rule editor to formulate a grammatically correct rule. In subsequent uses of the interface, the system can default to a different rule adapted to the user, e.g., to a rule that the user has used in the recent past, has saved as a "favorite", or has inherited from the company and group with which he or she is associated.

The initial rule 402 can be executed unmodified. In this case, for the example shown, it will return a list of all known shoppers in the system.

The screen can also include an area 404 to provide further information, e.g., graphs and analytics, about the currently targeted group of shoppers. In addition, the screen can include an area 406 and provide context sensitive help to the user in formulating the targeting rule.

In accordance with one or more embodiments of the invention, visual cues can be provided to indicate that a word or phrase can be changed into another word or phrase. A visual cue 408 is provided on the word "everyone" in the targeting rule 402 to indicate that the word is editable by the user. In this example, the visual cue is an underlining of the word. However, various other types of visual cues can be used for the same purpose including, e.g., a visually identifiable mark, font, style, coloring, highlighting, background, callout, or other noticeable accent.

Figure 4B:
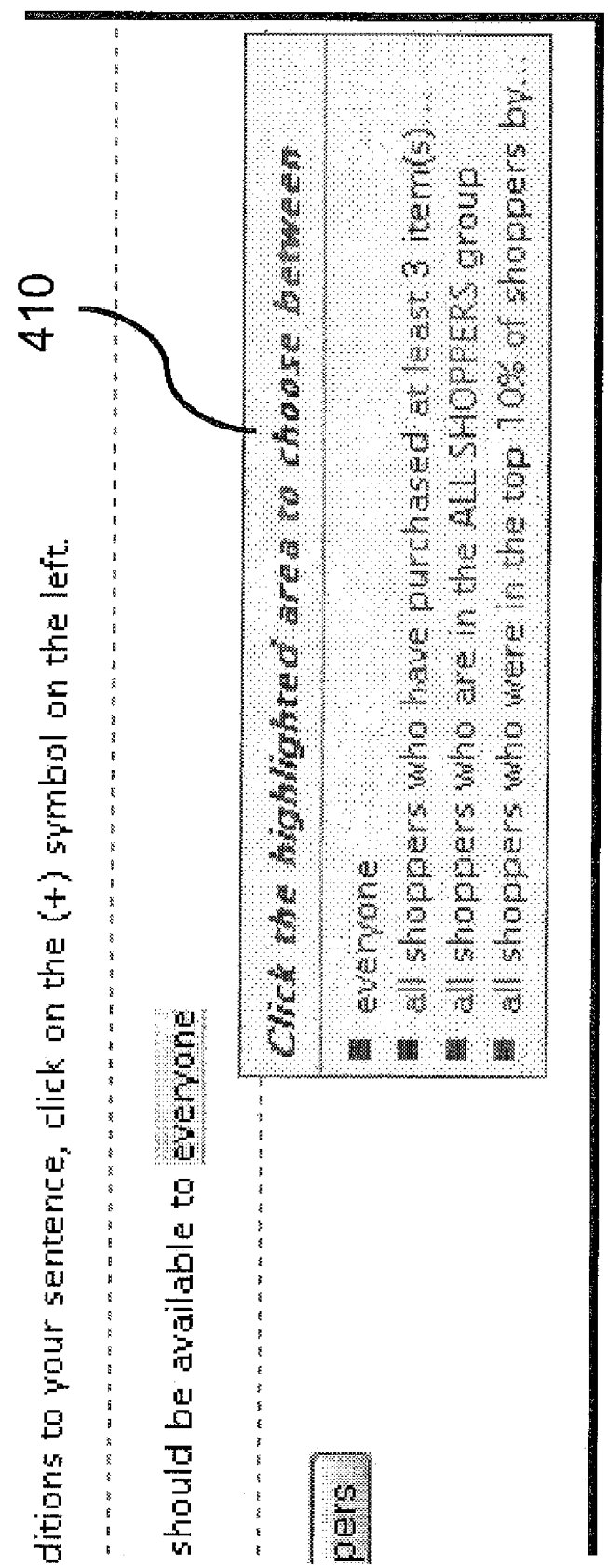

FIG. 4B illustrates two hinting mechanisms in accordance with one more embodiments of the invention. When the user's mouse (or other pointing device) hovers over the word "everyone," the word becomes highlighted, which is a hint to the user to indicate that the word can be edited if clicked. The highlighting provides a hint about the scope of the edit; only the word or phrase that can be edited becomes highlighted.

In addition, when the user's mouse or other pointing device hovers over the word "everyone," a context sensitive hint in a pop-up information box 410 appears to assist the user by anticipating what choices he or she will have if the user chooses to click on the word to edit it. The hint can contain, e.g., snippets of the different sentence variations the user could choose, descriptive text about the various choices, usage instructions (e.g., "click the highlighted area to choose between . . . "), examples of recently used or previously saved words or phrases, and any other context-sensitive information that could help the user.

In addition to the highlighting and pop-up boxes, other hinting mechanisms can also be used. For example, any visually identifiable mark, font, style, coloring, highlighting, background, callout, or other noticeable accent could be used to provide a hint about the scope of the editable text. In addition, various techniques of presenting the context sensitive information near, alongside, under, or above the editable word or phrase could be used to serve the same purpose.

Figure 4C:
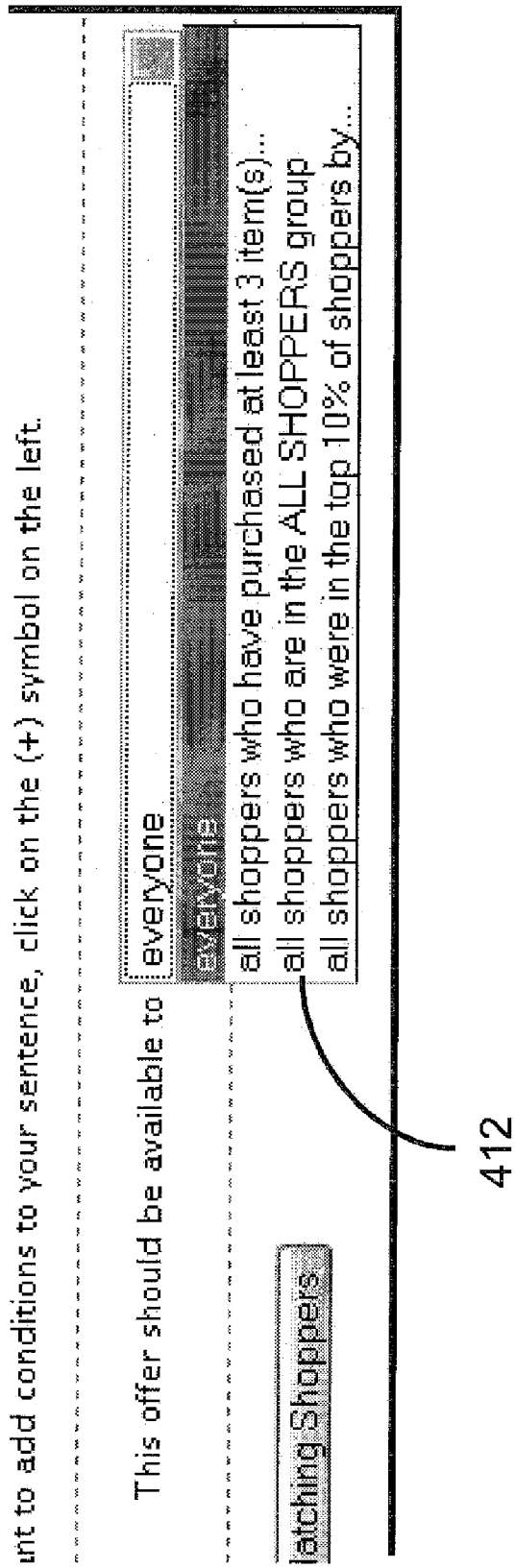

FIG. 4C illustrates a phrase editor to assist the user in modifying a word or phrase. When the user clicks on a highlighted word "everyone", an interactive word or phrase editor is provided to allow the user to modify the word or phrase. In this example, the editor is a drop down box 412 that allows the user to choose from four alternate sentence structures. The phrase editor will allow the user to choose only syntactically valid alternatives to the current phrase. The user can select one of the alternate phrases to change the targeting rule.

In one or more embodiments, context sensitive hints can be seamlessly integrated with the phrase editor. For example, if the context sensitive hint appears as a pop-up box, the contents of the box can be interactively selectable to allow direct editing of the phrase.

In addition to drop-down boxes, various other interactive user interface elements can be used that allow the user to select alternative phrases including, e.g., dynamic HTML controls, radio buttons, and embedded custom interactive controls.

Figure 4D:
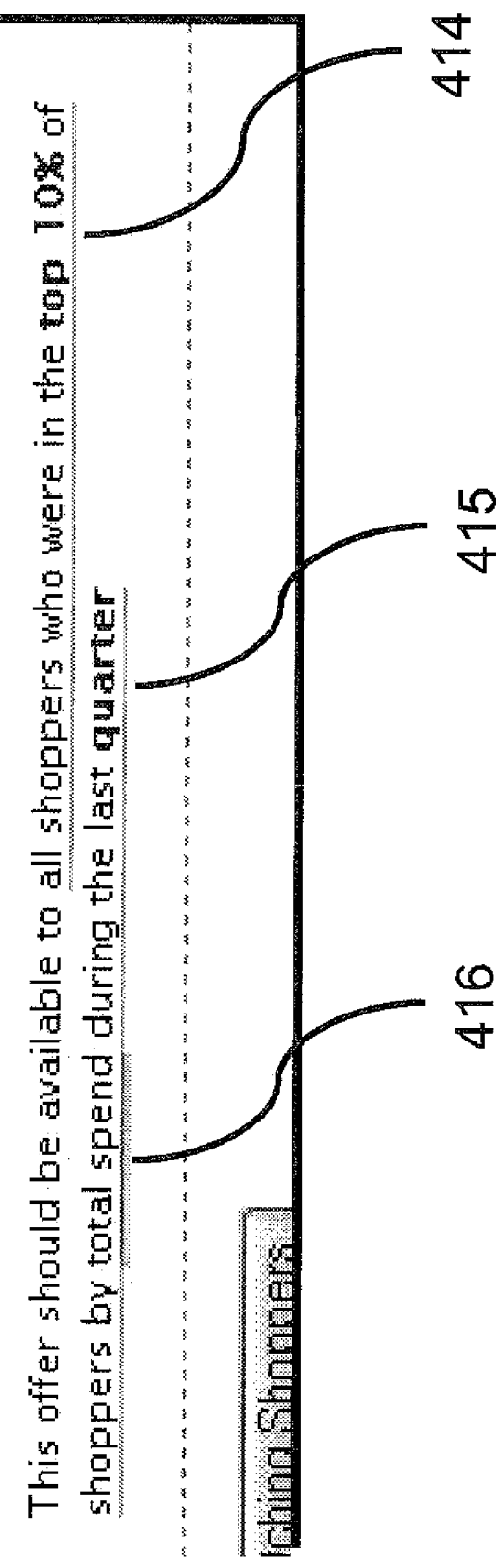

FIG. 4D illustrates an updated targeting rule that has been edited using the phrase editor. The text of the previous phrase ("everyone") is replaced with the text of the selected phrase ("all shoppers who were in the top 10% of shoppers by total spend during the last quarter"). The new phrase contains cues 414, 415, 416 indicating the editable parts of the phase. The phrase editor replaces the edited phrase with a syntactically valid phrase to ensure that the targeting rule is not in an invalid or error state. The particular set of replacement phrases offered by the phrase editor can depend on the system defaults, the past choices and preferences of the current user, the company and group with which the user is associated, and other context-specific information.

Additional types of cues can also be used to indicate other editable parts of the sentence. In this example, nested phrases are indicated using multiple underlines 416. In some embodiments, the further nested a phrase is within the sentence, the thicker the underline. This provides a visual indication to the user that the inner phrase is editable independently of the phrase that contains it. Multiple underlines can be used to indicate nested phrases (i.e. phrases within phrases). In this example, the phrase "total spend" is editable, as is the phrase that contains it, "all shoppers who were in the top 10% of shoppers by total spend during the last quarter".

In this example, bold font 414, 415 is used to indicate values that are directly modifiable. An editable value differs from an editable phrase in that a phrase can contain other values and/or phrases, while a value cannot.

As with the other cues disclosed herein, it should be noted that various other types of cues can also be used to identify editable parts of the targeting rule.

FIG. 4E illustrates a scoped phrase highlighting feature in accordance with one or more embodiments of the invention. In the example, hovering over any words of the top-level phrase with a mouse or other pointing device highlights the entire phrase, indicating that clicking will cause the entire phrase to be edited. A context-sensitive hint box 419 can be provided, which reflects the scope of the top-level phrase. In this example, all highlighted words 418 are considered part of the top-level phrase except: "top 10%" (because it is bold, this is an editable value), "total spend" (because it is double-underlined, this is an editable sub-phrase), and "quarter" (because it is bold, this is an editable value).

Figure 4F:
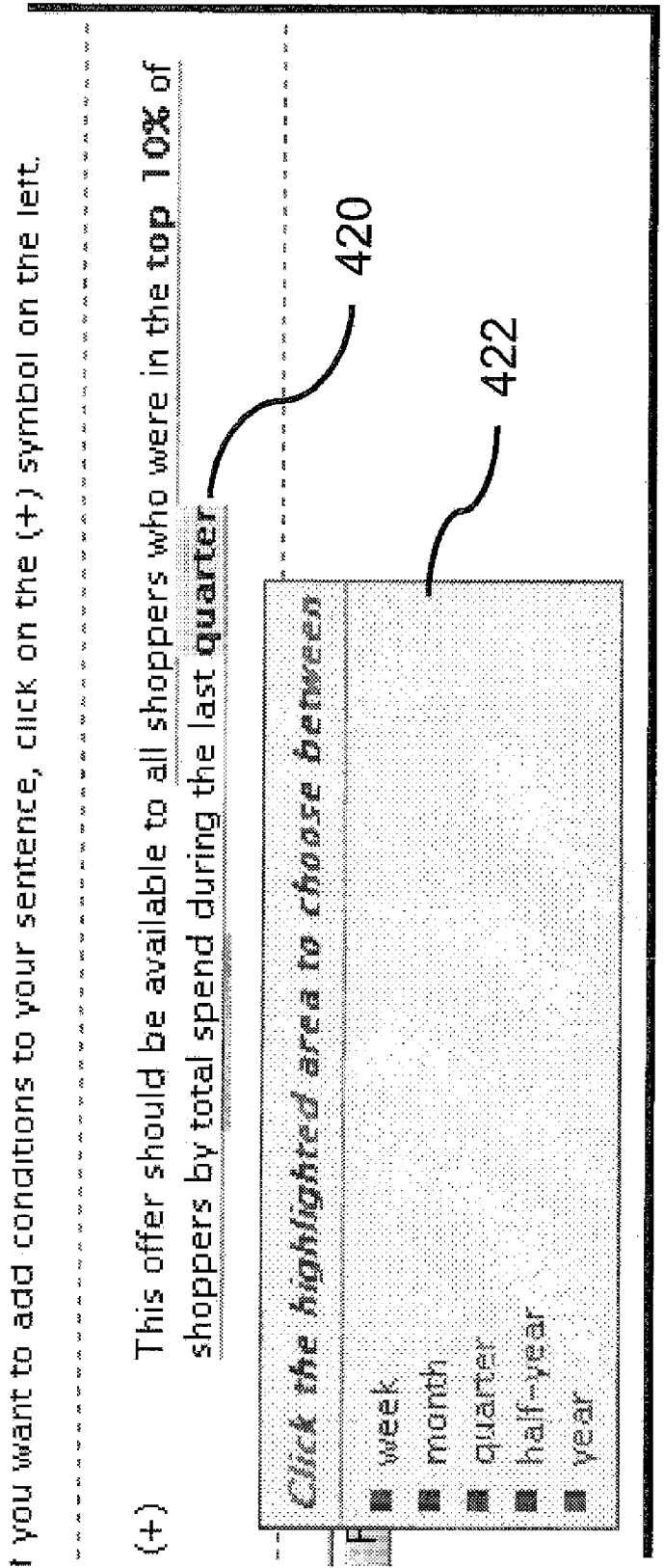

As shown in FIG. 4F, in this example, hovering over the word "quarter" 420 highlights just that word, indicating that clicking will cause only that word to be edited. A context-sensitive hint box 422 can be provided, which also reflects the scope of the modifiable value. The hint provided by the scoped highlighting can help the user quickly understand the extent of what will be edited. Although the specific stylistic convention for displaying scope need not be highlighting, it is preferably interactive so that the user does not become confused or disoriented about the potential impact of the scope of an edit.

Figure 4G:
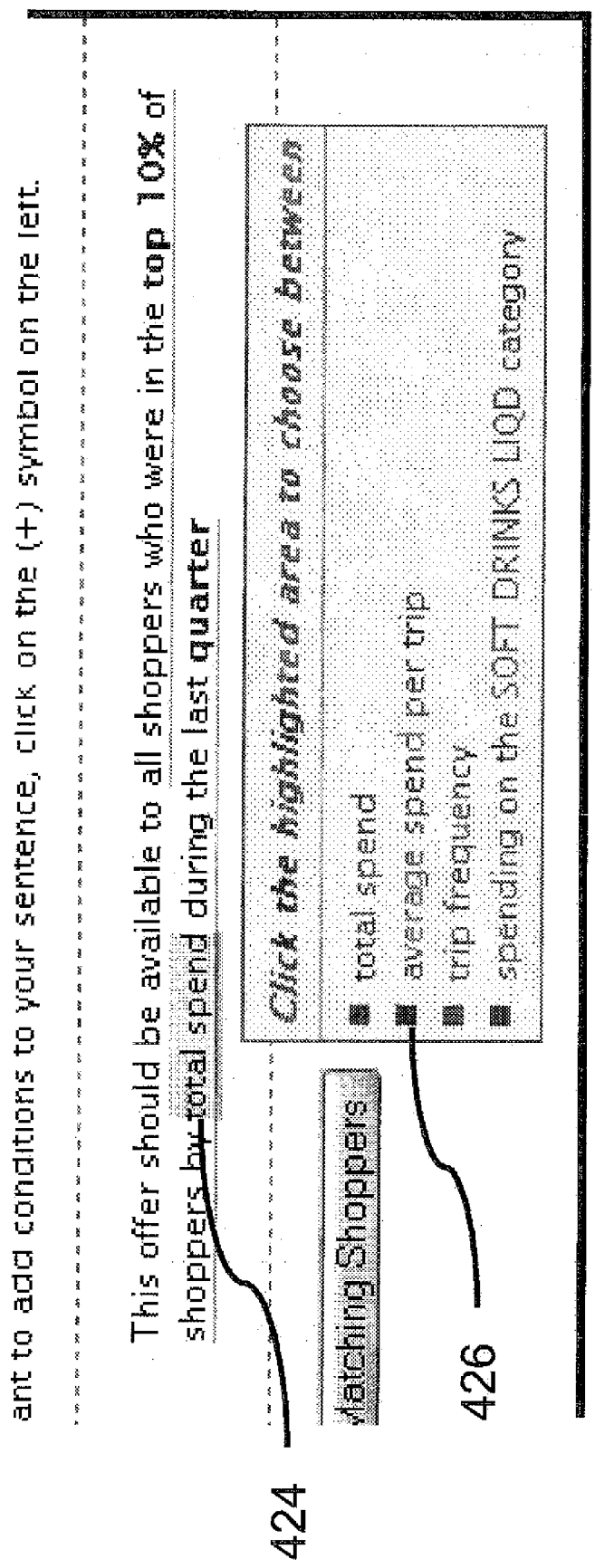

As shown in FIG. 4G, hovering over the phrase "total spend" 424 highlights just that phrase, indicating that clicking will cause only that phrase to be edited. A context-sensitive hint box 426 can be provided, which reflects the scope of the editable phrase. In this example, the reason "total spend" is not a value is that one of the choices for alternative phrases ("spending on the SOFT DRINKS LIQD category") is structurally different from the others in that it allows a further degree of editing. Specifically, the user could modify the value "SOFT DRINKS LIQD" to be some other category name.

Figure 4H:
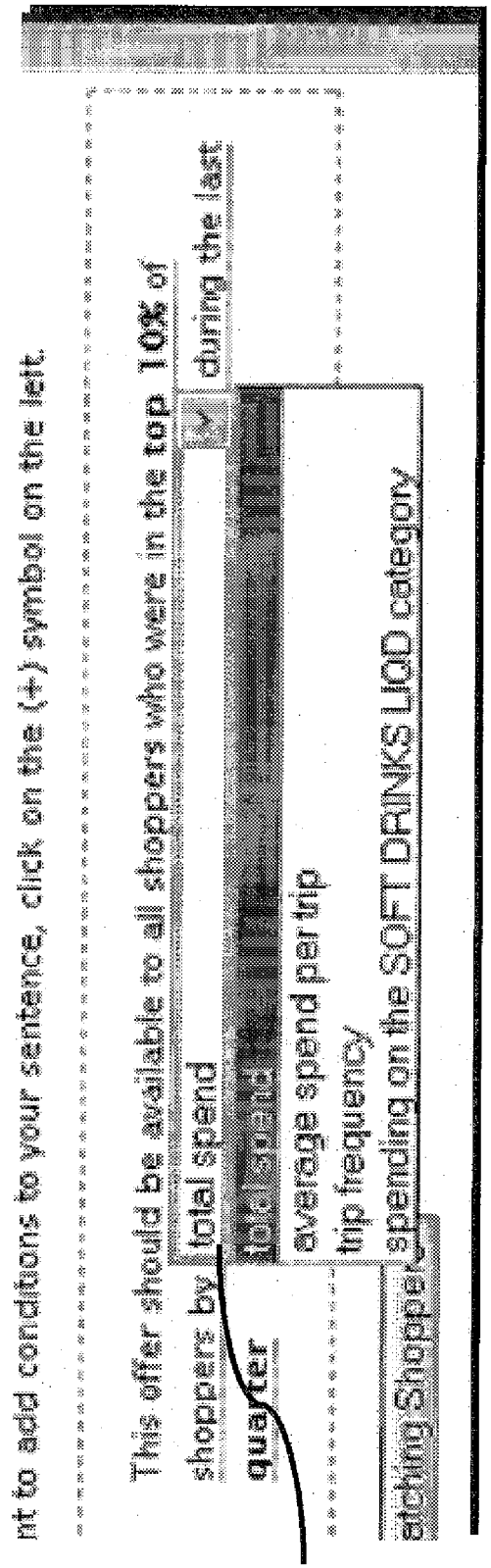

As shown in FIG. 4H, clicking on the nested phrase "total spend" 428 allows the user to substitute an alternative phase, just as could be done when editing the top-level phrase.

Figure 4I:
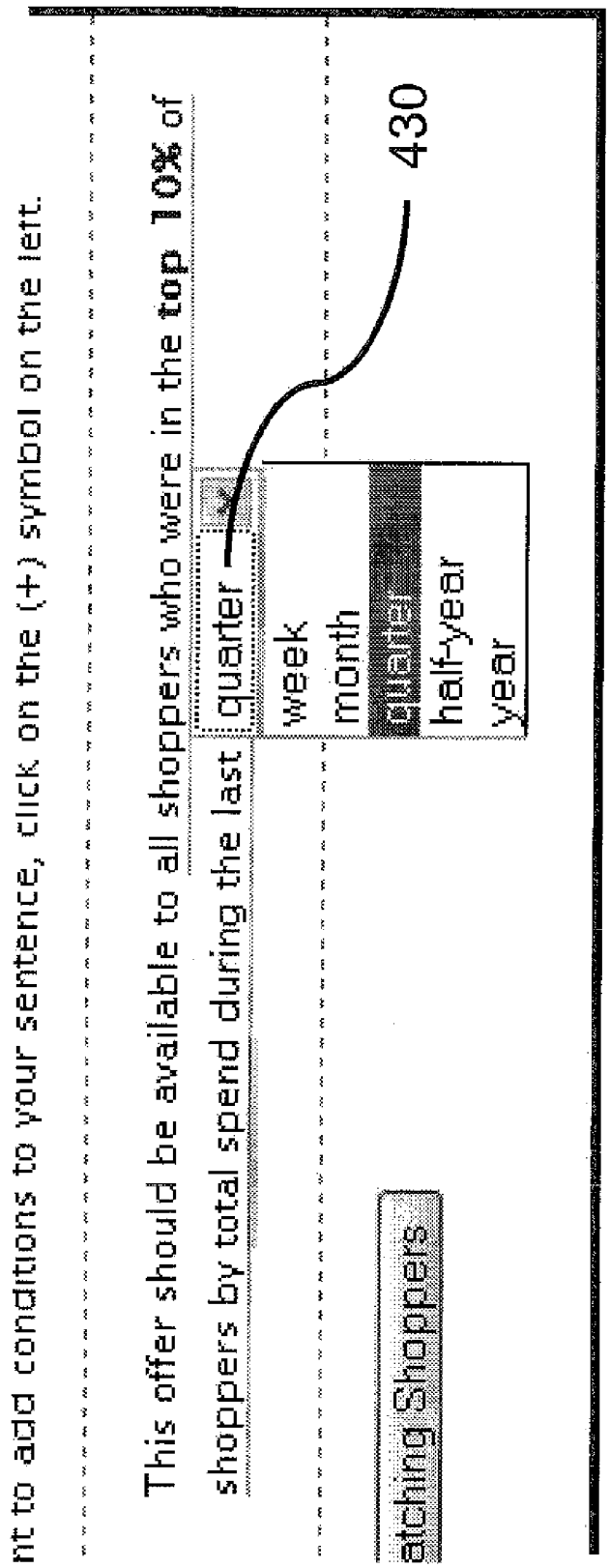

As shown in FIG. 4I, clicking on the modifiable value "quarter" 430 allows the user to substitute an alternative value. The editor for modifiable values can be sensitive to the type of value. In this example, the user can choose from an enumerated list that includes the values "week," "month," "quarter," "half-year," and "year." In other places, the value may be an integer, in which case the editor will allow the user to type an integer into a field.

Various types of value editors can be used that provide the user with the ability to quickly and easily edit the value, and to restrict the value to a valid choice or value for the specific context.

Figure 4J:
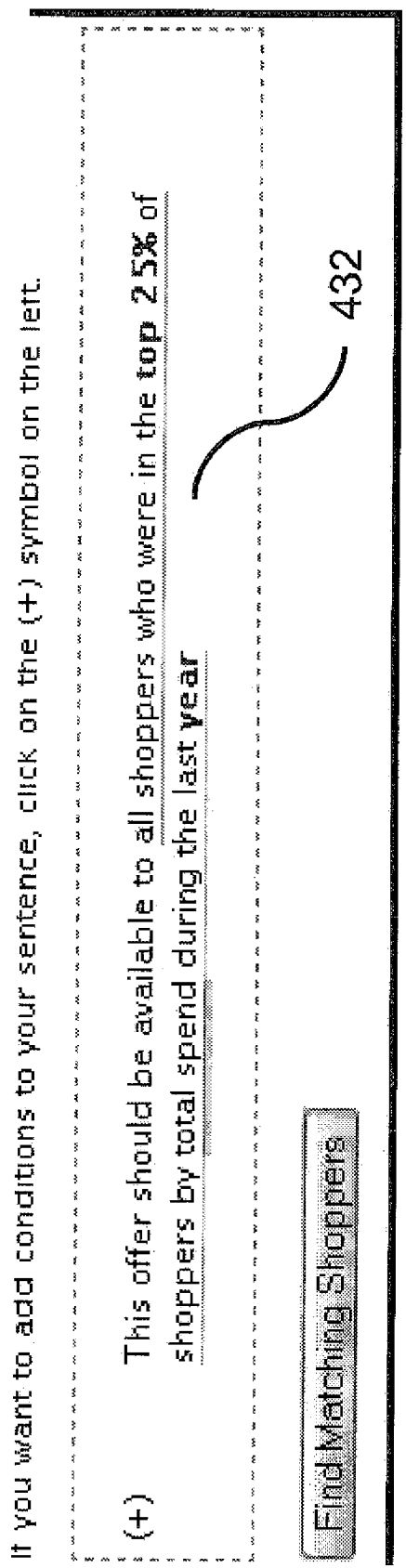

As shown in FIG. 4J, after selecting the desired values for the two modifiable values, the targeting rule 432 reflects the changes. It should be noted that throughout the process of editing a shopper targeting rule, the rule itself is easily readable and understandable.

Figure 4K:
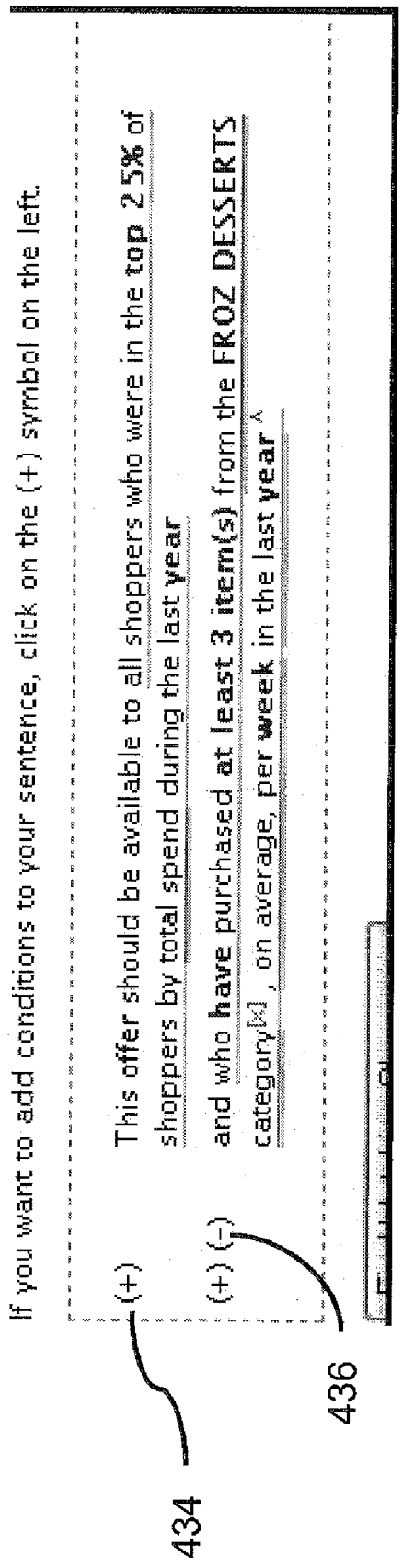

FIG. 4K illustrates how a condition to the targeting rule can be added in accordance with one or more embodiments. Clicking the "(+)" symbol 434 allows the user to add another condition to the targeting rule. The particular condition added may be determined contextually, based on, e.g., the user's past choices or preferences, or through an explicit choice by the user when adding the condition. The addition of a condition will not cause the sentence to become syntactically invalid. Clicking the "(−)" symbol 436 allows the user to remove the associated condition from the targeting rule.

Various indicators other than the "(+)" and "(−)" symbols shown in FIG. 4K can be used to add or remove conditions. Such indicators can include, e.g., icons, graphical buttons, links, textual links (such as "add" and "remove"), and other user interface indicators.

Figure 4L:
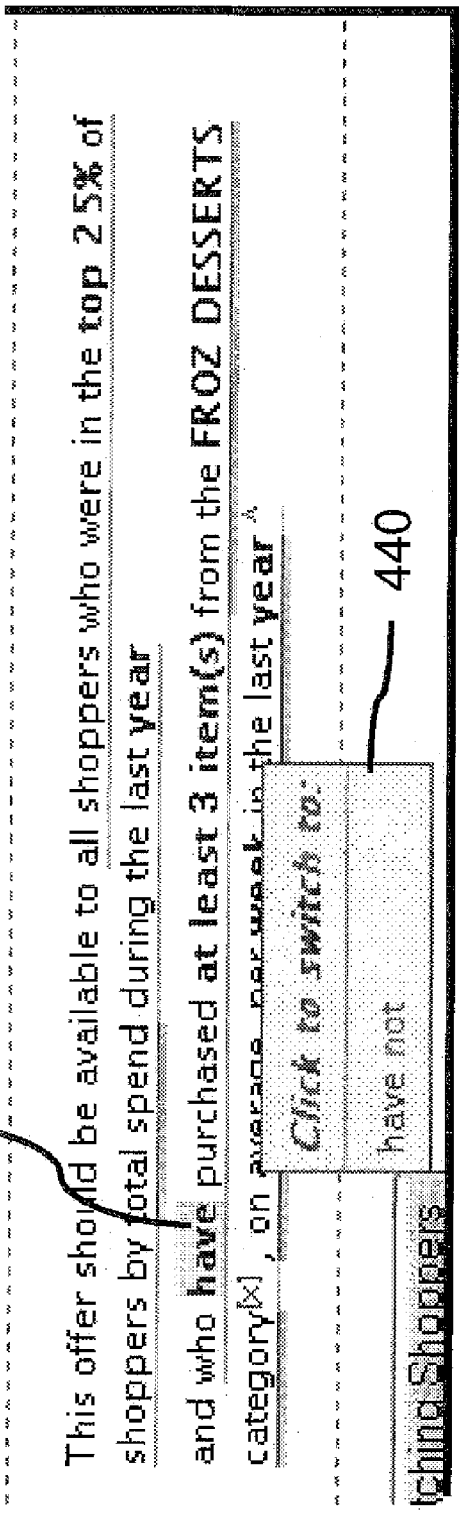

FIG. 4L illustrates editing a modifiable value by toggling between two values in accordance with one or more embodiments of the invention. For modifiable values with only two values ("have" and "have not" in this example) 438, clicking on the value causes it to toggle to the other choice for that value. A context-sensitive hint box for 40 can be provided to indicate how to edit the value. It should be noted that the particular use of a "click-to-toggle" interaction is not essential for enabling this aspect of the interface. This is simply a special case of an enumerated list, and it could be handed using the same value editor as is used for longer lists.

Figure 4M:
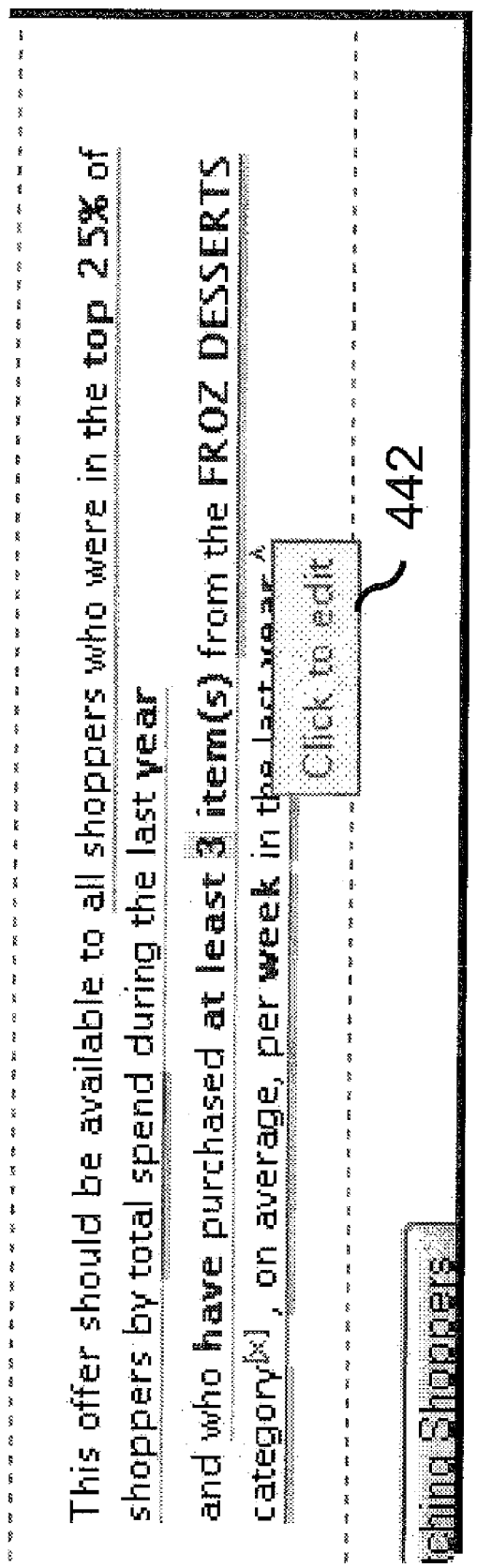

FIG. 4M illustrates use of hints to indicate editable numerical values in accordance with one or more embodiments of the invention. For modifiable values that allow for a numerical input, a context-sensitive hint 442 can be provided to indicate how to edit the value.

Figure 4N:
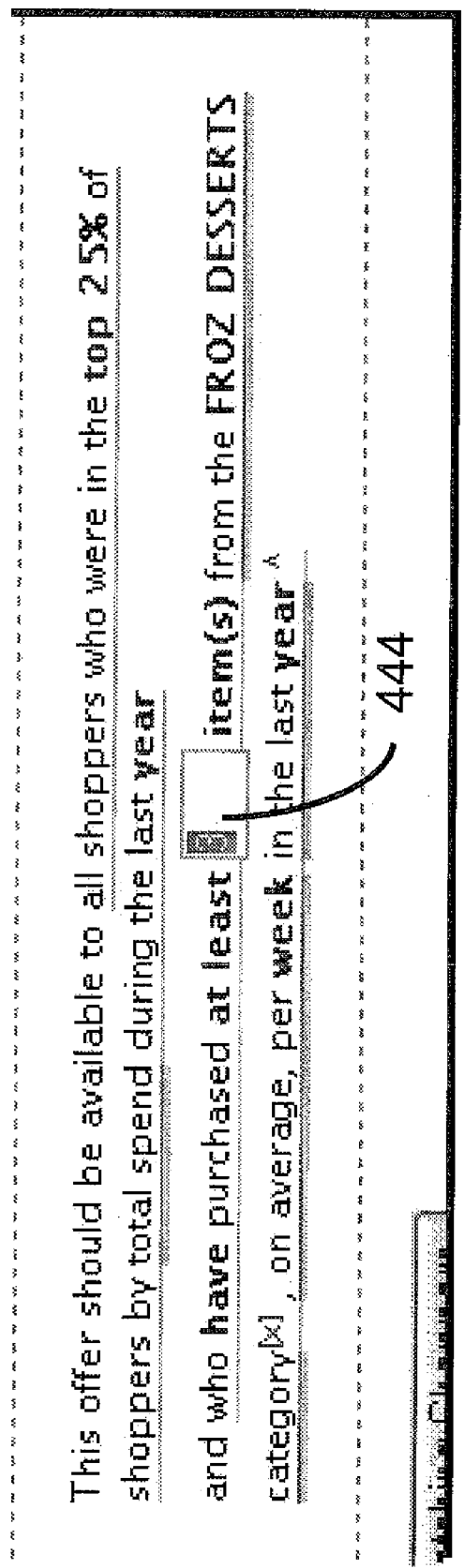
Figure 40:
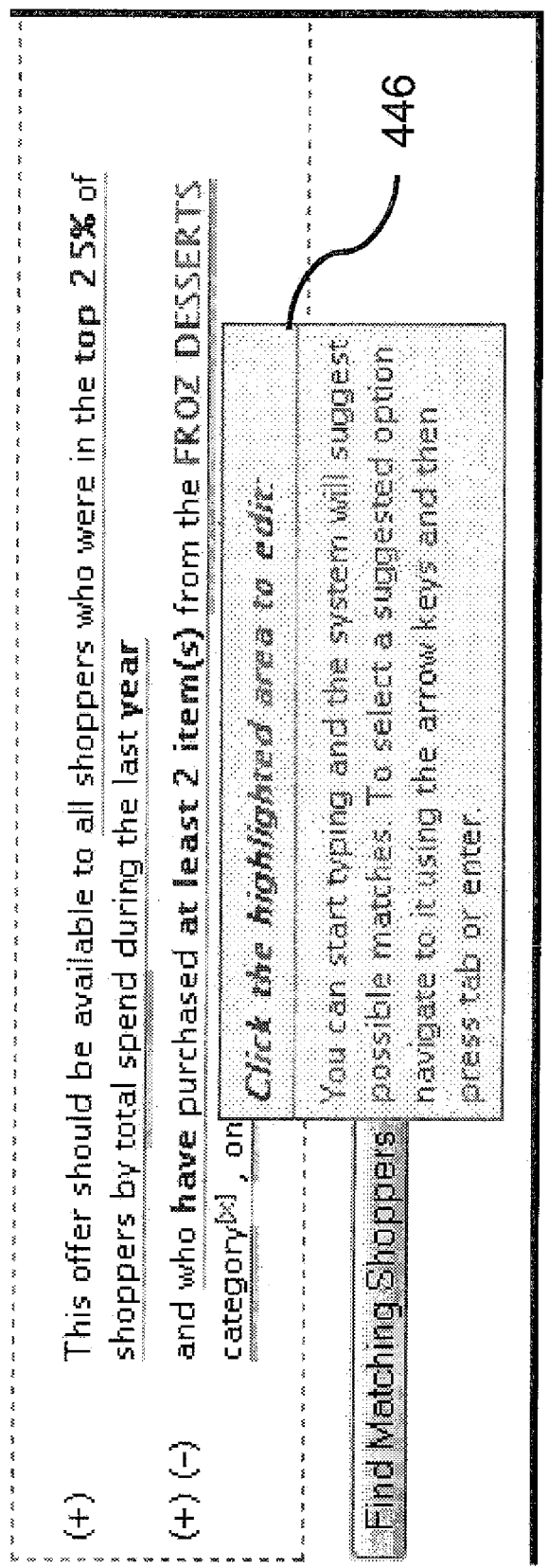

FIG. 4N illustrates editing a modifiable numerical value in accordance with one or more embodiments of the invention. For modifiable values that allow for a numerical input, clicking on the value causes it to turn into an editable text box 444. Although the inline editing is generally intuitive for most users, other forms of editing could also be used for the same purpose. The editor can initially contain a previous value, and it selects the text of the previous value to allow for easy overwriting of the old value. In order to prevent invalid entries, the numerical value editor should validate or constrain the text that is entered so that it only contains properly-formed numerical entries.

FIG. 4O illustrates use of lookup fields to edit values in a targeting rule in accordance with one or more embodiments of the invention. When the user hovers over a modifiable value that contains references to pre-defined values (such as, e.g., named product categories), a context-sensitive hint 446 can be provided to indicate how to edit the value. In this example, as shown in FIG. 4P, after clicking on the value in a lookup field, an interactive editor 448 appears inline in the sentence. As the user types the name of the referenced item (in this example, the name of the category "POT PIES FROZ"), the editor actively filters a list of all categories that match the text entered.

The interactive filtering of the lookup editor can increase the speed with which a user can find the desired value and decrease the likelihood of errors. The editor can initially contain a previous value, and select the text of the previous value to allow for easy overwriting of the old value. In order to prevent invalid entries, the lookup field editor should validate or constrain the text that is entered so that it only contains valid names for the referenced data type. It should be noted that the interactive lookup field is not essential for enabling this aspect of the interface. Any other user interface element that allows for the user to search for or specify the desired values and to select the specific value intended could be used.

Figure 4Q:
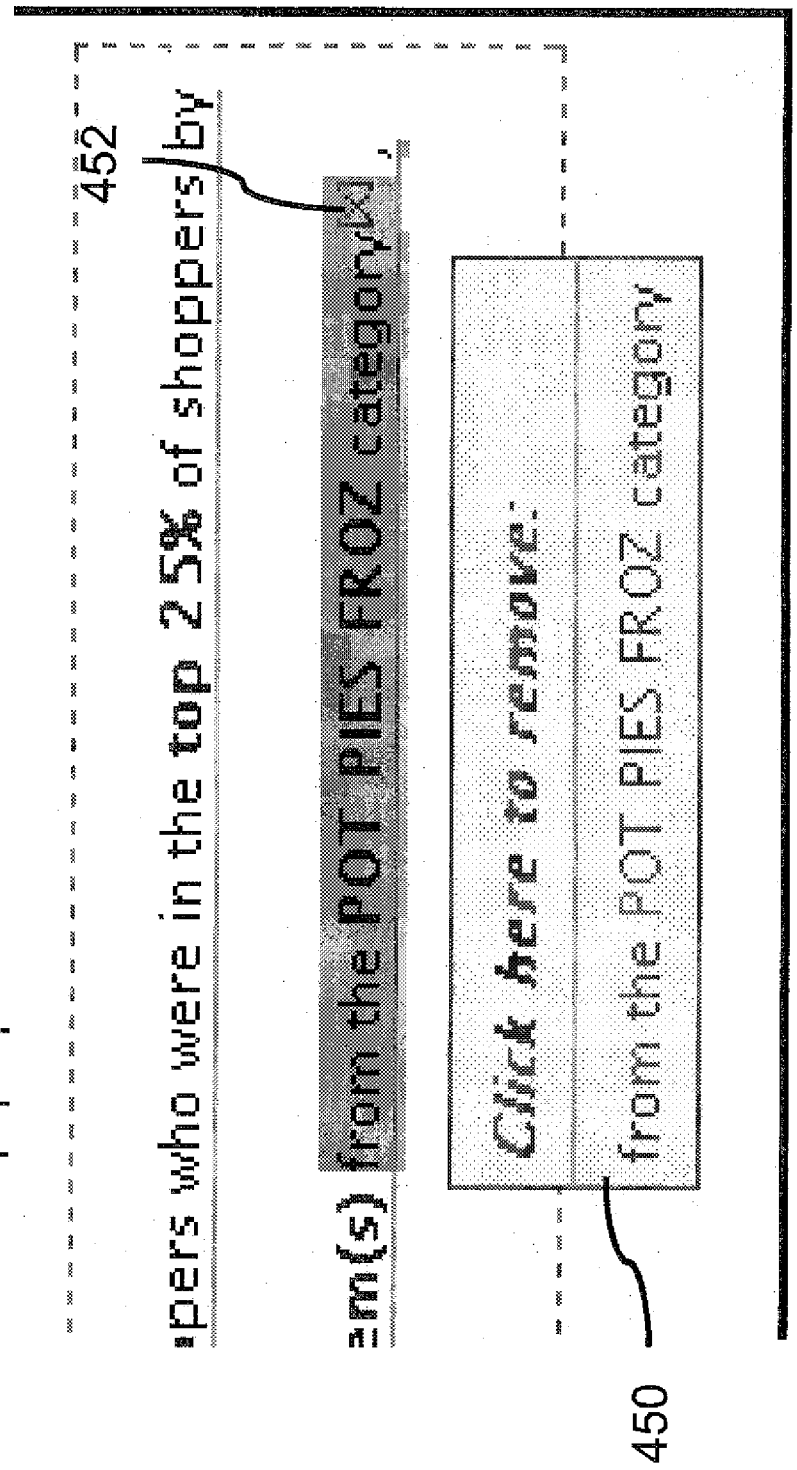

FIG. 4Q illustrates removing an optional phrase in accordance with one or more embodiments of the invention. Hovering over the "[x]" symbol 452 at the end of a phrase highlights, e.g., in red, the phrase that will be removed by clicking the "[x]" symbol 452. This only applies to optional phrases; if a phrase is required by the targeting rule language grammar, then it will not have an "[x]" symbol appear after it. A context-sensitive hint 450 appears when the user's mouse hovers over an "[x]" symbol 452 and explains the impact of clicking.

It should be noted that there are other user interface conventions that could be used to indicate the scope of a deletion or to serve as the "remove" indication that would serve the same purpose. For example, the use of an icon or graphic button in place of the "[x]" symbol, or the use of the word "delete" or "remove" or replacement of the phrase with an empty phrase are also possible.

Figure 4R:
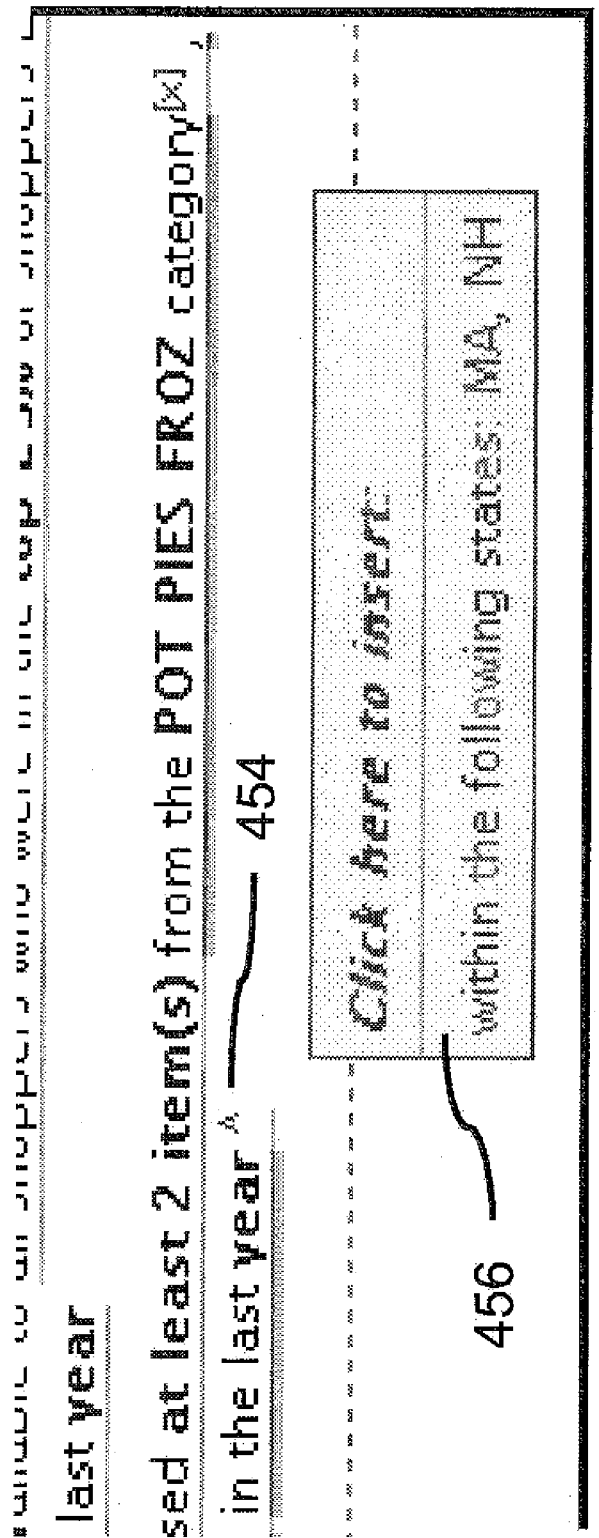

FIG. 4R illustrates inserting an optional phrase in a targeting rule in accordance with one or more embodiments of the invention. A user hovering his mouse or other pointer over the "^" symbol 454 at the end of a phrase will receive a hint 456 that clicking it will insert an optional phrase at that point. This only applies to optional phrases; if a phrase is required by the targeting rule language grammar, then it will not be hidden. The context-sensitive hint 456 explains the impact of clicking the "^" symbol 454.

It should be noted that there are other user interface conventions that could be used to indicate the point where an optional phrase will be inserted or to serve as the "insert" indication that would serve the same purpose. For example, the use of an icon or graphic button in place of the "^" symbol, or the use of the word "add" or "insert" are also possible. In some embodiments, instead of inserting an optional phrase, the encompassing phrase may be replaced with a larger phrase including the original phrase and the newly-inserted optional clause.

Figure 4S:

FIG. 4S illustrates an example of a completed targeting rule generated by the interactive targeting rule editor. Once the shopper targeting rule has been modified to meet the desired criteria, the user can submit the targeting rule by selecting button 458 system to find matching shoppers.

In accordance with one or more embodiments of the invention, the system could apply the targeting rule after each modification made by the user to obtain intermediate search results, e.g., during periods of inactivity, or at regular time intervals. Increasing the frequency of rule evaluation could provide interactive feedback to the user about the number of matching shoppers and some summary statistics about that population.

FIG. 4T illustrates exemplary search results 460 presented to the user. The results area can be used to display a count of the shoppers who matched, along with information about the shoppers. In accordance with one or more embodiments, if the results were sufficiently small, i.e., if few shoppers matched the query, shopper identifications for the particular shoppers who matched could be provided, if desired.

In accordance with one or more embodiments of the invention, the results area could contain other relevant information about the shoppers such as, e.g., summary statistics, graphs of overall purchase patterns, or comparisons of the targeted shoppers versus the population as a whole.

It is to be understood that although the invention has been described above in terms of particular embodiments, the foregoing embodiments are provided as illustrative only, and do not limit or define the scope of the invention. Various other embodiments are also within the scope of the claims. For example, elements and components described herein may be further divided into additional components or joined together to form fewer components for performing the same functions.

The techniques for conducting searches described herein are preferably implemented in software, and accordingly one of the preferred implementations of the invention is as a set of instructions (program code) in a code module resident in the random access memory of the computer. Until required by the computer, the set of instructions may be stored in another computer memory, e.g., in a hard disk drive, or in a removable memory such as an optical disk (for eventual use in a CD-ROM), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Method claims set forth below having steps that are numbered or designated by letters should not be considered to be necessarily limited to the particular order in which the steps are recited.

What is claimed is:

1. A computer-implemented method of conducting a search of electronically stored information, comprising:
    (a) providing a user with an interactive targeting rule editor to enable the user to formulate a targeting rule to identify desired search results, the targeting rule comprising a natural language text string, the interactive targeting rule editor allowing the user to change one or more designated editable portions of the natural language text string to one of a set of specified alternate portions to form a syntactically valid targeting rule in accordance with a targeting rule grammar, wherein at least one of the specified alternate portions includes one or more further designated editable portions that are changeable by the user to one of a further set of specified alternate portions to form the syntactically valid targeting rule;
    (b) receiving the text string or a representation thereof from the user;
    (c) translating the text string or a representation thereof into an executable query; and
    (d) executing the executable query against the electronically stored information to generate search results.

2. The method of claim 1 further comprising step (e) transmitting the search results to the user, storing the search results, or performing additional processing or analysis on the search results.

3. The method of claim 1 wherein the interactive targeting rule editor only permits the formation of syntactically-valid targeting rules in accordance with a targeting rule grammar upon each change, delete, or add step by the user.

4. The method of claim 1 wherein the interactive targeting rule editor provides a syntactically valid default natural language text string to the user.

5. The method of claim 1 wherein the targeting rule editor can operate recursively on the natural language text string.

6. The method of claim 1 wherein the interactive targeting rule editor identifies through visual cues the editable portions of the natural language text string that may be changed, removable portions of the natural language text string that may be deleted, or locations in the natural language text string at which insertable portions may be added.

7. The method of claim 1 wherein said electronically stored information includes information on a plurality of members of a group and characteristics of said members, and wherein said search results comprise an identification of a particular subset of members of said group.

8. The method of claim 7 wherein said members of said group comprise shoppers at one or more given businesses, and wherein said characteristics comprise attributes of said shoppers and past shopping behaviors.

9. The method of claim 1 wherein the user operates a client device, and wherein the method is implemented in a server that interacts with the client device over a network.

10. The method of claim 1 wherein step (c) includes analyzing the natural language text string using a grammar definition to identify particular grammatical constructs and values, and constructing the executable query using said grammatical constructs or values.

11. A computer-implemented system for conducting a search of electronically stored information, comprising:
    a data storage system containing the electronically stored information; and
    a server receiving a natural language text string or a representation thereof from a user, the natural language text string or representation thereof comprising a targeting rule directed at identifying desired search results from said electronically stored information, the server translating the natural language text string or representation thereof into an executable query, and executing the executable query against the electronically stored information to generate the desired search results;
    wherein the user generates the natural language text string using an interactive targeting rule editor to enable the user to formulate the natural language text string, the interactive targeting rule editor allowing the user to change one or more designated editable portions of the natural language text string to one of a set of specified alternate portions to form a syntactically valid targeting rule in accordance with a targeting rule grammar, wherein at least one of the specified alternate portions includes one or more further designated editable portions that are changeable by the user to one of a further set of specified alternate portions to form the syntactically valid targeting rule.

12. The computer-implemented system of claim 11 wherein the server transmits the search results to the user, stores the search results, or performs additional processing or analysis on the search results.

13. The computer-implemented system of claim 11 wherein the interactive targeting rule editor only permits the formation of syntactically-valid targeting rules in accordance with a targeting rule grammar upon each change, delete, or add step by the user.

14. The computer-implemented system of claim 11 wherein the interactive targeting rule editor provides a syntactically valid default natural language text string to the user.

15. The computer-implemented system of claim 11 wherein the targeting rule editor can operate recursively on the natural language text string.

16. The computer-implemented system of claim 11 wherein the interactive targeting rule editor identifies through visual cues the editable portions of the natural language text string that may be changed, removable portions of the natural language text string that may be deleted, or locations in the natural language text string at which insertable portions may be added.

17. The computer-implemented system of claim 11 wherein said electronically stored information includes information on a plurality of members of a group and characteristics of said members, and wherein said search results comprise an identification of a particular subset of members of said group.

18. The computer-implemented system of claim 17 wherein said members of said group comprise shoppers at one or more given businesses, and wherein said characteristics comprise attributes of said shoppers and past shopping behaviors.

19. The computer-implemented system of claim 11 wherein the user operates a client device, and the server interacts with the client device over a network.

20. The computer-implemented system of claim 11 wherein the server includes a language analyzer for analyzing the natural language text string using a grammar definition to identify particular grammatical constructs and values, and a targeting engine to construct the executable query using said grammatical constructs or values.

21. The computer-implemented system of claim 11 wherein the server provides the interactive targeting rule editor to the user.

22. A computer program product for conducting a search of electronically stored information, said computer program product residing on a non-transitory computer readable medium having a plurality of instructions stored thereon which, when executed by the processor, cause that processor to:
(a) provide a user with an interactive targeting rule editor to enable the user to formulate a targeting rule to identify desired search results, the targeting rule comprising a natural language text string, the interactive targeting rule editor allowing the user to change one or more designated editable portions of the natural language text string to one of a set of specified alternate portions to form a syntactically valid targeting rule in accordance with a targeting rule grammar, wherein at least one of the specified alternate portions includes one or more further designated editable portions that are changeable by the user to one of a further set of specified alternate portions to form the syntactically valid targeting rule;
(b) translate a natural language text string generated by the user or a representation of said natural language text string into an executable query; and
(c) execute the executable query against the electronically stored information to generate search results.

23. The computer program product of claim 22 further comprising instructions that cause the processor to transmit the search results to the user, store the search results, or perform additional processing or analysis on the search results.

24. The computer program product of claim 22 wherein the interactive targeting rule editor only permits the formation of syntactically-valid targeting rules in accordance with a targeting rule grammar upon each change, delete, or add step by the user.

25. The computer program product of claim 22 wherein the interactive targeting rule editor provides a syntactically valid default natural language text string to the user.

26. The computer program product of claim 22 wherein the targeting rule editor can operate recursively on the natural language text string.

27. The computer program product of claim 22 wherein the interactive targeting rule editor identifies through visual cues the editable portions of the natural language text string that may be changed, removable portions of the natural language text string that may be deleted, or locations in the natural language text string at which insertable portions may be added.

28. The computer program product of claim 22 wherein said electronically stored information includes information on a plurality of members of a group and characteristics of said members, and wherein said search results comprise an identification of a particular subset of members of said group.

29. The computer program product of claim 28 wherein said members of said group comprise shoppers at one or more given businesses, and wherein said characteristics comprise attributes of said shoppers and past shopping behaviors.

30. The computer program product of claim 22 wherein the user operates a client device, and wherein the computer program product is executed in a server that interacts with the client device over a network.

31. The computer program product of claim 22 wherein the computer program product is executed in a computer operated by the user.

32. The computer program product of claim 22 further comprising instructions that cause the processor to analyze the natural language text string using a grammar definition to identify particular grammatical constructs and values, and construct the executable query using said grammatical constructs or values.

33. The method of claim 1 wherein the interactive targeting rule editor further enables the user to delete one or more designated removable portions of the natural language text string, or add one or more of a set of specified insertable portions to form the syntactically valid targeting rule.

34. The computer-implemented system of claim 11 wherein the interactive targeting rule editor further enables the user to delete one or more designated removable portions of the natural language text string, or add one or more of a set of specified insertable portions to form the syntactically valid targeting rule.

35. The computer program product of claim 22 wherein the interactive targeting rule editor further enables the user to delete one or more designated removable portions of the natural language text string, or add one or more of a set of specified insertable portions to form the syntactically valid targeting rule.

36. A computer-implemented method of conducting a search of electronically stored information, comprising:
(a) providing a user with an interactive targeting rule editor to enable the user to formulate a targeting rule to identify desired search results, the targeting rule comprising a natural language text string, the interactive targeting rule editor allowing the user to change one or more designated editable portions of the natural language text string to one of a set of specified alternate portions, delete one or more designated removable portions of the natural language text string, and add one or more of a set of specified insertable portions to form a syntactically valid targeting rule in accordance with a targeting rule grammar;
(b) receiving the text string or a representation thereof from the user;
(c) translating the text string or a representation thereof into an executable query; and
(d) executing the executable query against the electronically stored information to generate search results.

37. The method of claim 36 wherein at least one of the specified alternate portions includes one or more further designated editable portions that can be changed by the user to one of a further set of specified alternate portions to form the syntactically valid targeting rule.

* * * * *